US011983965B2

(12) United States Patent
Jang et al.

(10) Patent No.: US 11,983,965 B2
(45) Date of Patent: May 14, 2024

(54) ELECTRONIC DEVICE FOR BIOMETRIC AUTHENTICATION AND METHOD FOR OPERATING THE SAME

(71) Applicant: Samsung Electronics Co., Ltd., Suwon-si (KR)

(72) Inventors: Wonsuk Jang, Suwon-si (KR); Juwoan Yoo, Suwon-si (KR); Heejun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 17/520,400

(22) Filed: Nov. 5, 2021

(65) Prior Publication Data
US 2022/0138480 A1 May 5, 2022

Related U.S. Application Data
(63) Continuation of application No. PCT/KR2021/015455, filed on Oct. 29, 2021.

(30) Foreign Application Priority Data
Nov. 5, 2020 (KR) .................. 10-2020-0146853

(51) Int. Cl.
*G06V 40/50* (2022.01)
*G06F 16/22* (2019.01)
(Continued)

(52) U.S. Cl.
CPC ............. *G06V 40/50* (2022.01); *G06F 16/22* (2019.01); *G06F 18/22* (2023.01); *G06F 21/32* (2013.01);
(Continued)

(58) Field of Classification Search
CPC .... G06V 40/50; G06V 10/751; G06V 10/993; G06V 40/14; G06V 40/197;
(Continued)

(56) References Cited

U.S. PATENT DOCUMENTS 8,214,652 B2 * 7/2012 LaCous ................. H04L 9/3231
382/125
9,471,765 B1 10/2016 Setterberg et al.
(Continued)

FOREIGN PATENT DOCUMENTS

JP 2009-064202 A 3/2009
JP 2010-231320 A 10/2010
(Continued)

OTHER PUBLICATIONS

International Search Report and Written Opinion of the International Searching Authority dated Jan. 28, 2022, in connection with International Application No. PCT/KR2021/015455, 10 pages.

*Primary Examiner* — Pinalben Patel

(57) ABSTRACT

An electronic device includes at least one processor connected with a biometric sensor and memory, and configured to perform biometric authentication using a first matching algorithm and a first template DB, install a second matching algorithm and a second template DB and set the second template DB to an inactive state, determine whether a predetermined template registration condition is met when biometric authentication using the first matching algorithm and the first template DB is successful, generate a template including input biometric information of the successful biometric authentication and register the template in the second template DB in the inactive state in case that the template registration condition is met, set the second template DB to an active state in case that the second template DB meets a predetermined template activation condition,
(Continued)

US 11,983,965 B2

Page 2 and perform the biometric authentication using the second matching algorithm and the second template DB in the active state.

15 Claims, 17 Drawing Sheets

(51) Int. Cl.
    *G06F 18/22*     (2023.01)
    *G06F 21/32*     (2013.01)
    *G06V 10/75*     (2022.01)
    *G06V 10/98*     (2022.01)
    *G06V 40/12*     (2022.01)
    *G06V 40/14*     (2022.01)
    *G06V 40/16*     (2022.01)
    *G06V 40/18*     (2022.01)

(52) U.S. Cl.
    CPC .......... *G06V 10/751* (2022.01); *G06V 10/993* (2022.01); *G06V 40/1365* (2022.01); *G06V 40/14* (2022.01); *G06V 40/172* (2022.01); *G06V 40/197* (2022.01)

(58) Field of Classification Search
    CPC .. G06V 40/1365; G06V 40/172; G06F 16/22; G06F 18/22; G06F 21/32
    See application file for complete search history.

(56) References Cited

U.S. PATENT DOCUMENTS

| | | | | |
|---|---|---|---|---|
| 11,074,428 | B2 * | 7/2021 | Chung | ................... G06V 40/13 |
| 11,157,719 | B2 * | 10/2021 | Yoon | ....................... G06F 21/32 |
| 2004/0193893 | A1 | 9/2004 | Braithwaite et al. | |
| 2007/0226512 | A1 | 9/2007 | Kevenaar et al. | |
| 2007/0230753 | A1 | 10/2007 | Kitane et al. | |
| 2008/0077359 | A1 * | 3/2008 | Ito | ........................... G06F 21/32 |
| | | | | 702/187 |
| 2008/0293033 | A1 * | 11/2008 | Scicchitano | ........ H04L 63/0861 |
| | | | | 434/350 |
| 2009/0070860 | A1 | 3/2009 | Hirata et al. | |
| 2010/0275258 | A1 | 10/2010 | Kamakura | |
| 2017/0132408 | A1 | 5/2017 | Kim et al. | |
| 2018/0204058 | A1 | 7/2018 | Yoo et al. | |
| 2018/0365402 | A1 | 12/2018 | Ko et al. | |
| 2019/0005342 | A1 | 1/2019 | Rosqvist | |
| 2019/0042866 | A1 | 2/2019 | Mostafa et al. | |
| 2019/0080066 | A1 | 3/2019 | Van Os et al. | |
| 2021/0004451 | A1 | 1/2021 | Novik et al. | |
| 2021/0382970 | A1 | 12/2021 | Odinokikh et al. | |
| 2021/0406347 | A1 | 12/2021 | Kim et al. | |
| 2022/0292172 | A1 | 9/2022 | Sims et al. | |
| 2022/0318369 | A1 | 10/2022 | Chae | |

FOREIGN PATENT DOCUMENTS

| | | |
|---|---|---|
| JP | 2021-150681 A | 9/2021 |
| KR | 10-2004-0000477 A | 1/2004 |
| KR | 10-2007-0024569 A | 3/2007 |
| KR | 10-2011-0119214 A | 11/2011 |
| KR | 10-2017-0003348 A | 1/2017 |
| KR | 10-2018-0012283 A | 2/2018 |
| KR | 10-2018-0084397 A | 7/2018 |
| KR | 10-2018-0102574 A | 9/2018 |
| KR | 10-2018-0127795 A | 11/2018 |
| KR | 10-2018-0137948 A | 12/2018 |
| KR | 10-2020-0032161 A | 3/2020 |
| KR | 10-2020-0047294 A | 5/2020 |
| KR | 10-2137060 B1 | 7/2020 |
| KR | 10-2020-0096696 A | 8/2020 |
| KR | 10-2021-0128513 A | 10/2021 |
| KR | 10-2022-0084058 A | 6/2022 |

* cited by examiner

ELECTRONIC DEVICE FOR BIOMETRIC AUTHENTICATION AND METHOD FOR OPERATING THE SAME

CROSS-REFERENCE TO RELATED APPLICATIONS

This application is a bypass continuation of International Application No. PCT/KR2021/015455, filed Oct. 29, 2021, which claims priority to Korean Patent Application 10-2020-0146853, filed Nov. 5, 2020, the disclosures of which are herein incorporated by reference in their entirety.

BACKGROUND

1. Field

Various embodiments relate to electronic devices for biometric authentication and methods of operating the same.

2. Description of Related Art

As the importance of protecting personal information increases, an electronic device uses a user authentication scheme to enhance security. Various security authentication schemes, such as password, pattern, and biometric authentication, may be used for user authentication. Among them, biometric authentication may be performed based on the user's biometric information, which are unique physical characteristics, such as the user's fingerprint, iris, face, voice, retina, blood vessel, and the like.

Electronic devices provide various services in relation to user authentication based on the user's biometric information. Biometric information is very effective in terms of security as well as ease of use because there is little risk of theft and imitation. Accordingly, biometric information is used as information for user authentication in many electronic devices. For example, electronic devices, such as smart phones, may provide various and complex financial services, such as purchase and payment of goods, deposit and withdrawal, and remittance, as well as basic services, such as phone calls or text messaging, and may use biometric authentication to allow the user's access to these financial services. Further, an electronic device, such as a smart phone, may store security-sensitive data, such as user health information or work information, and may provide the data to the user through biometric authentication.

As such, the electronic device may provide more advanced security using the user's biometric information to authenticate the user and perform a security-required service.

SUMMARY

To perform user authentication (i.e., biometric authentication) using biometric information in the electronic device, the user's biometric information may be input, and the inputted user's biometric information may be compared (or matched) with the user's reference biometric information previously stored in the database. The user's pre-stored reference biometric information may be biometric information initially input by the user (e.g., when registering biometric information). Further, the electronic device may change the user's reference biometric information previously stored in the database according to the biometric information input after registration (e.g., upon biometric information authentication).

In the biometric authentication system, the matcher or matching algorithm, which is a device for performing matching to enhance the accuracy and performance of biometric authentication, may be changed or updated. When the matching algorithm is changed, the characteristics and format of the template including the user's reference biometric information previously stored in the database are also changed. Thus, it is necessary to delete the reference biometric information previously stored in the database and re-register new reference biometric information. However, if the existing reference biometric information is deleted, normal biometric authentication is not possible until effective new reference biometric information is re-registered. Thus, user inconvenience may occur due to authentication failure. Further, to configure new reference biometric information, there may be inconvenience in that the user has to re-register biometric information.

Accordingly, there may be proposed a technology that allows for enhanced biometric authentication accuracy and performance and an enhanced user experience without user inconvenience upon changing or updating the matching algorithm for biometric authentication in an electronic device.

According to an embodiment, an electronic device may comprise a biometric sensor; a memory storing at least one template database (DB) including templates representing biometric features; and at least one processor operatively connected with the biometric sensor and the memory. The at least one processor may be configured to perform biometric authentication using a first matching algorithm and a first template DB, the first template DB being among the at least one template DB, install a second matching algorithm and a second template DB, the second template DB being among the at least one template DB, set the second template DB to an inactive state, determine whether a predetermined template registration condition is met based on identifying the biometric authentication using the first matching algorithm and the first template DB is successful, in response to a determination that the template registration condition is met, generate a template including input biometric information of the successful biometric authentication and register the template in the second template DB in the inactive state, in response to identifying the second template DB meets a predetermined template activation condition, set the second template DB to an active state, and perform biometric authentication using the second matching algorithm and the second template DB in the active state.

According to an embodiment, a method for performing biometric authentication by an electronic device may comprise performing biometric authentication using a first matching algorithm and a first template DB, installing a second matching algorithm and a second template DB, setting the second template DB to an inactive state, determining whether a predetermined template registration condition is met based on identifying the biometric authentication using the first matching algorithm and the first template DB is successful, in response to a determination that the template registration condition is met, generating a template including input biometric information of the successful biometric authentication and registering the template in the second template DB in the inactive state, in response to identifying the second template DB meets a predetermined template activation condition, setting the second template DB to an active state, and performing the biometric authentication using the second matching algorithm and the second template DB in the active state.

According to an embodiment, it is possible to enhance biometric authentication accuracy and performance while ensuring user convenience for biometric information-based user authentication in the electronic device.

According to an embodiment, it is possible to enhance the user experience of biometric authentication while minimizing user inconvenience in the electronic device.

According to an embodiment, it is possible to provide enhanced matching performance while minimizing user inconvenience in the electronic device equipped with a biometric authentication system.

Effects of the disclosure are not limited to the foregoing, and other unmentioned effects would be apparent to one of ordinary skill in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Figure 1:
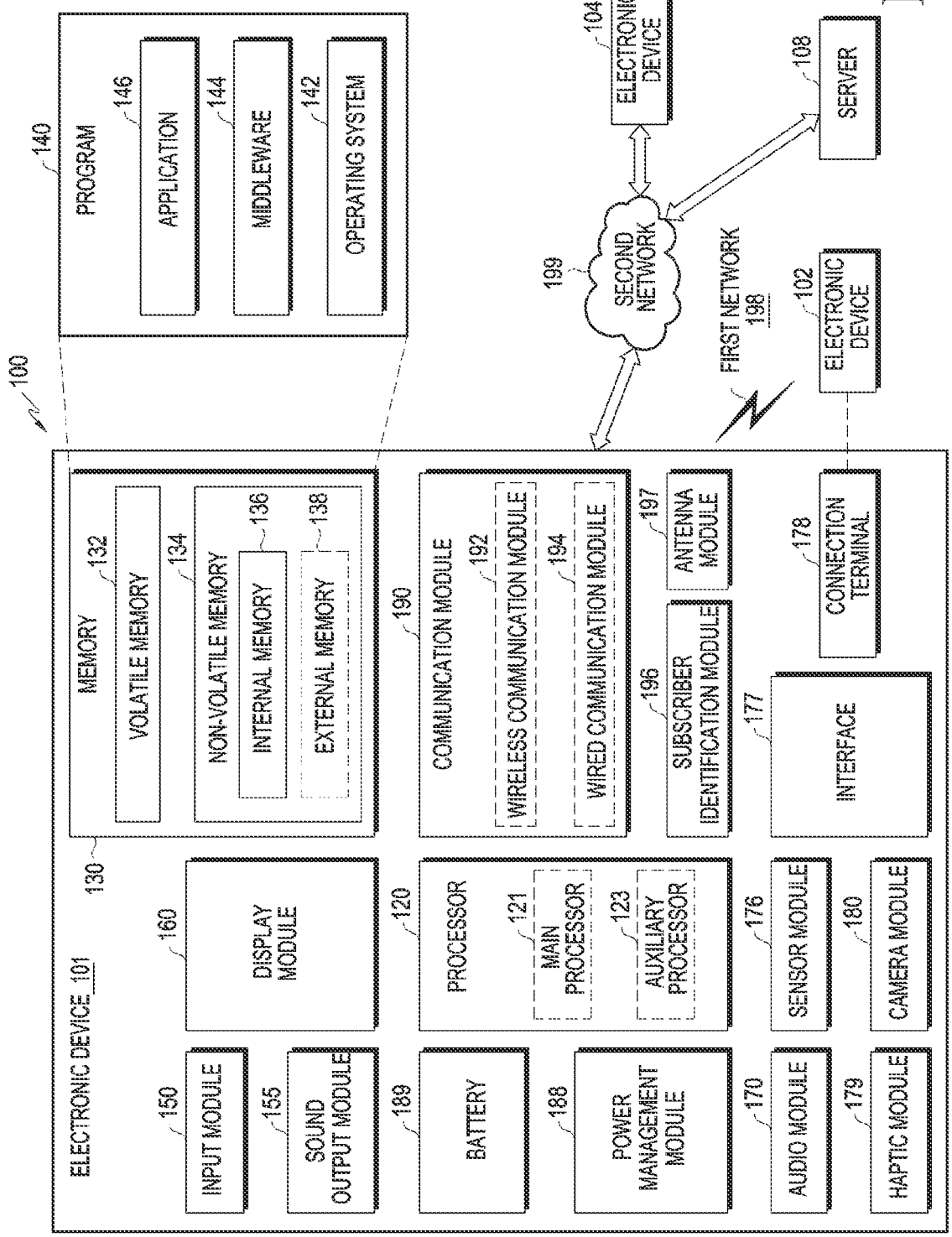
FIG. 1 is a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication interface 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
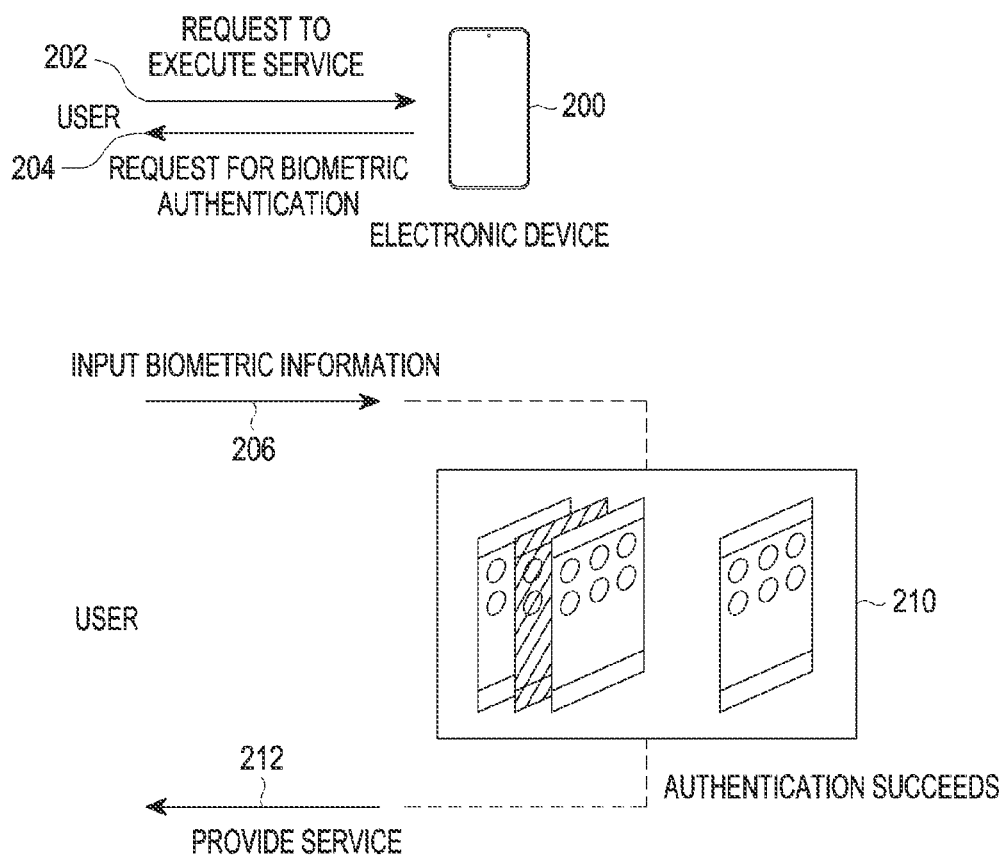
FIG. 2 is a view illustrating an interaction between a user and an electronic device according to various embodiments of the disclosure.

FIG. 2 is a view illustrating an interaction between a user and an electronic device according to various embodiments of the disclosure.

Referring to FIG. 2, the electronic device 200 may interact with the user. The electronic device 200 may correspond to the electronic device 101 shown in FIG. 1. The electronic device 200 may receive a request 202 to execute a specific service (or function) (e.g., a financial service application, a healthcare application, or a security application). The electronic device 200 may send a request 204 for biometric authentication for executing the service to the user in response to the execution request 202.

For example, the electronic device 200 may drive a camera (e.g., the camera module 180 of FIG. 1) and output a notification to request to position the face or the iris of the eye on the camera screen. As another example, the electronic device 200 may output a notification to request to position the user's finger on a fingerprint sensor (e.g., the sensor module 176 of FIG. 1) included in the electronic device 200. The electronic device 200 may receive biometric information 206 input from the user through a biometric sensor (e.g., the sensor module 176 of FIG. 1). The electronic device 200 may authenticate the biometric information 206 based on a result obtained by inputting the received biometric information 206 to a designated matching algorithm 210. The designated matching algorithm 210 may be a software model or engine that may be stored in a memory (e.g., the memory 130 of FIG. 1) of the electronic device 200, installed by the processor 120, and used for authentication of biometric information (e.g., identifies whether an input template corresponding to the input biometric information matches a pre-stored biometric template).

If the input biometric information 206 is authenticated (in other words, if an input template corresponding to the input biometric information matches a stored biometric template), the electronic device 200 may provide the user with the service 212 requested to be executed.

Figure 3:
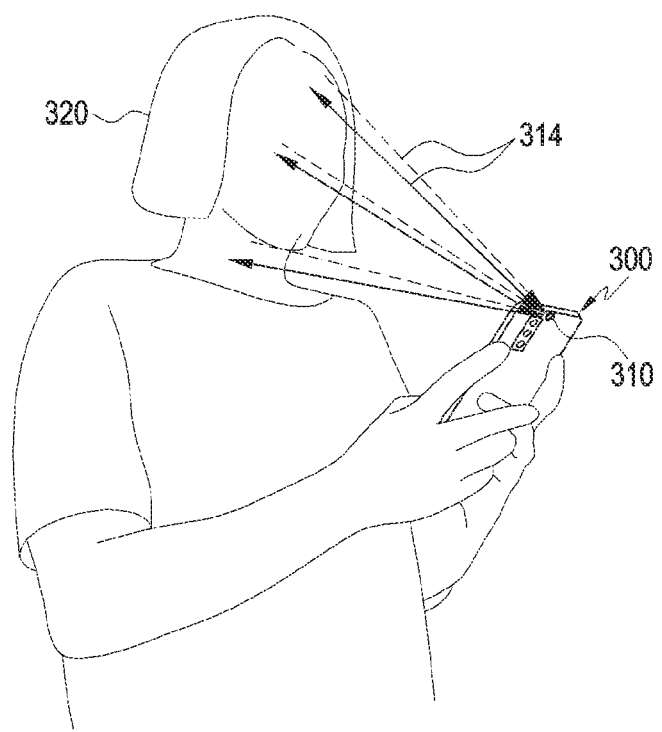
FIG. 3 is a view illustrating user authentication in an electronic device according to various embodiments of the disclosure.

FIG. 3 is a view illustrating user authentication in an electronic device for describing various embodiments of the disclosure.

Referring to FIG. 3, the electronic device 300 may interact with the user 320. The electronic device 300 may correspond to the electronic device 101 shown in FIG. 1. The electronic device 300 may include at least one biometric sensor 310 (e.g., the sensor module 176 of FIG. 1) configured to gather at least one type of biometric information and obtain the input biometric information for the user 320 through the biometric sensor 310. The input biometric information may be obtained from a signal 314 received through the biometric sensor 310 and, in the illustrated example, may include biometric samples representing characteristics of at least one of the iris, face, voice, and retina that may be used for biometric authentication. Although not shown, the electronic device 300 may include other types of biometric sensors (not shown) and may obtain biometric samples, such as at least one of fingerprints, iris, face, voice, retina, or blood vessels. The biometric samples mean original biometric data that may be obtained through the biometric sensor 310 in biometric authentication. The electronic device 300 may determine whether to allow the user 320 to access by comparing (i.e., matching) the obtained input biometric information with previously stored reference biometric information.

To this end, the electronic device 300 includes a database for storing reliable reference biometric information for the user 320. The reference biometric information may include at least one biometric data template (hereinafter simply referred to as a 'template') that may be generated by a matching algorithm used for biometric authentication, and the database is referred to as a template DB. In the field of biometric authentication, a template may be defined as a set of salient features representing a specific biometric characteristic extracted from biometric samples. For example, a fingerprint template may consist of coordinates of specific landmarks, commonly referred to as minutiae. As another example, a finger vein template may be a binary matrix representing the occurrence of veins in a finger. In other words, the template is a concise representation of important characteristics that may be used to differentiate the biometrics of different people.

Figure 4:
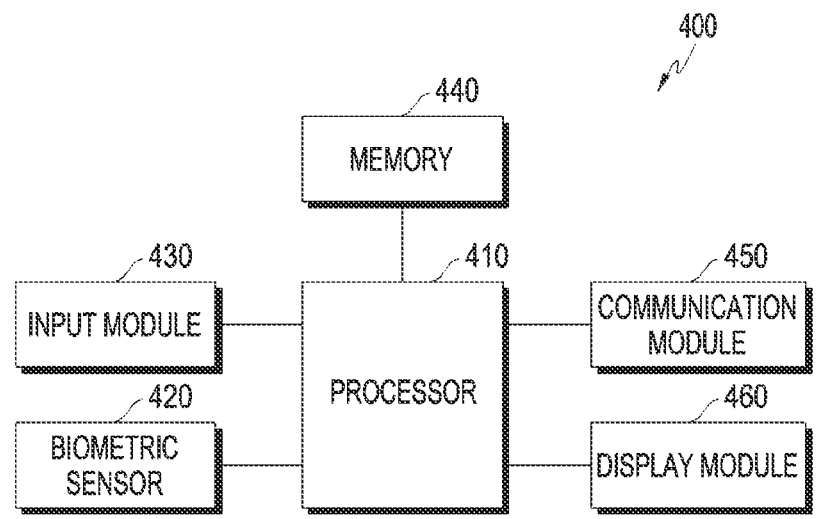
FIG. 4 is a block diagram of an electronic device according to various embodiments of the disclosure.

FIG. 4 is a block diagram illustrating an electronic device for describing various embodiments of the disclosure.

Referring to FIG. 4, an electronic device 400 may include a processor 410 for performing functions related to biometric authentication, a memory 440 for storing information and data related to biometric authentication, and a biometric sensor 420 and, optionally, may further include at least one of an input module 430, a communication module 450, and a display module 460. The electronic device 400 may correspond to the electronic device 101 illustrated in FIG. 1 or the electronic device 300 of FIG. 3. The biometric sensor 420 may correspond to the sensor module 176 of FIG. 1 or the biometric sensor 310 of FIG. 3. The input module 430, the communication module 450, and the display module 460 may correspond to the input module 150, the communication module 190, and the display module 160, respectively, of FIG. 1.

In an embodiment, the input module 430 may include an input interface for receiving data or content (e.g., text information or voice information) from the user. For example, the input module 430 may receive a user input to request to execute one application among a plurality of applications installed on the electronic device 400.

The biometric sensor 520 is configured to receive user's biometric information. As an example, the user's biometric information may represent at least one of a fingerprint, a finger vein, an iris, a pupil, and a face. In an embodiment, the biometric sensor 520 may include an image sensor or camera module (e.g., the camera module 180 of FIG. 1) capable of obtaining the user's iris image, pupil image, or face image. In an embodiment, the biometric sensor 520 may include an image sensor capable of scanning the user's fingerprint image or finger vein image.

The display module 460 may output data or content so that the user may visually recognize it. The display module 460 may further include a touch circuit for receiving the user's touch input.

The memory 440 may store instructions (or a set of instructions, a program code, or an application) for executing at least one of various embodiments of the disclosure. In an embodiment, the memory 440 may store at least one template DB including reference biometric information that may be used for biometric authentication. For example, the memory 440 may store a code of at least one matching algorithm that may be used for biometric authentication.

The communication module 450 may exchange data with an external device (e.g., the server 108 illustrated in FIG. 1). For example, the communication module 450 may receive a program code of an enhanced version of matching algorithm from a server or an external computer device under the control of the processor 410.

The processor 410 may control the overall operation of the electronic device 400 to implement various embodiments of the disclosure. The processor 410 may load commands or data for implementing various embodiments of the disclosure to the memory 440 (e.g., the volatile memory 132) and may process the loaded commands or data. The processor 410 may be operatively or electrically connected with the biometric sensor 420, the input module 430, the memory 440, the communication module 450, and the display module 460 to transmit/receive data or signals. In one embodiment, the processor 410 may install the program code of the matching algorithm received from the server or the external computer device to be executable and may secure a storage space for a template DB corresponding to the matching algorithm in the memory 440. The storage space for the template DB may be determined based on the maximum number of templates that may be included in the template DB.

Figure 5:
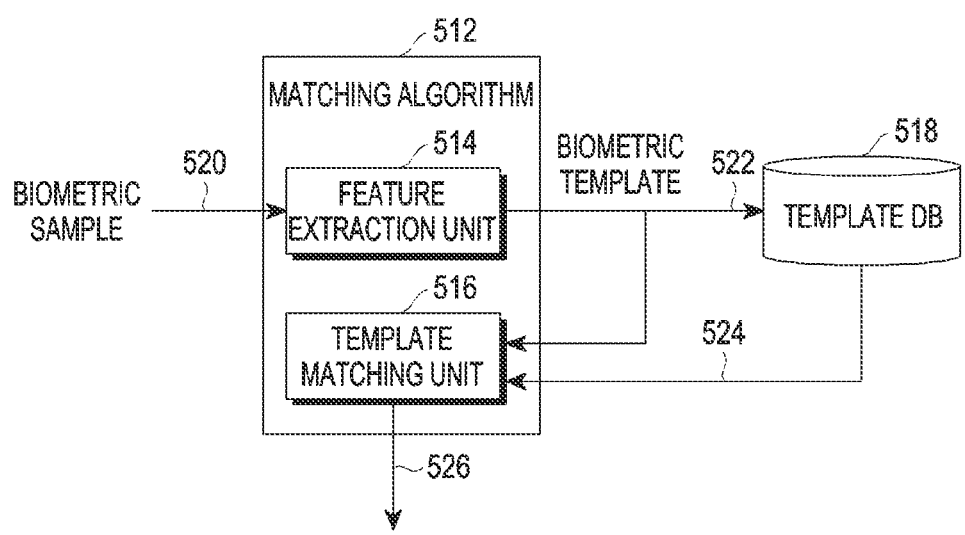
FIG. 5 is a view illustrating functions in an electronic device for biometric authentication according to an embodiment of the disclosure.

FIG. 5 is a view illustrating functions in an electronic device for biometric authentication according to an embodiment of the disclosure.

FIG. 5 illustrates a matching algorithm 512 that may be used for biometric authentication and a template DB 518 configured to correspond to the matching algorithm 512. The matching algorithm 512 may be executed by a processor (e.g., the above-described processor 120 of FIG. 1 or 410 of FIG. 4), and the template DB 518 may be stored in a memory (e.g., the above-described memory 130 of FIG. 1 or 440 of FIG. 4).

The matching algorithm 512 may include a feature extraction unit 514 and a template matching unit 516. The feature extraction unit 514 may extract features from biometric samples 520 of the input biometric information and generate a template 522 including the features. The template matching unit 516 may calculate a matching similarity by comparing a template 522 (hereinafter, an 'input template') corresponding to the input biometric information with at least one template 524 stored in the template DB 518 and, if the matching similarity is larger than a predetermined threshold (e.g., Threshold_verify), determine that the biometric authentication of the input template is successful and output the result 526 of successful biometric authentication. As an embodiment, if biometric authentication is successful in template matching unit 516, the input template 522 may be additionally stored in the template DB 518 and may be used as reference biometric information in next biometric authentication. As an embodiment, if biometric authentication is successful in template matching unit 516 and the input template 522 is determined to be reliable according to a predetermined criterion, the input template 522 may be added to the template DB 518.

In a biometric authentication system, there is a need to change a matching algorithm to enhance the accuracy and performance of biometric authentication. In an embodiment, in an electronic device 101, such as a smart phone, an existing matching algorithm may be changed or replaced with a new matching algorithm through a software update. The new matching algorithm may use the templates stored in the existing template DB as it is but may require templates in a new or changed format.

As such, if the matching algorithm is changed (e.g., updated from version N−1 to version N), the characteristics of the biometric template may be changed. Thus, the new matching algorithm is not compatible with the existing template DB, so that it may be impossible to ensure recognition accuracy and normal authentication. Therefore, it may be necessary to delete the existing template DB and re-register a new template DB.

Figure 6:
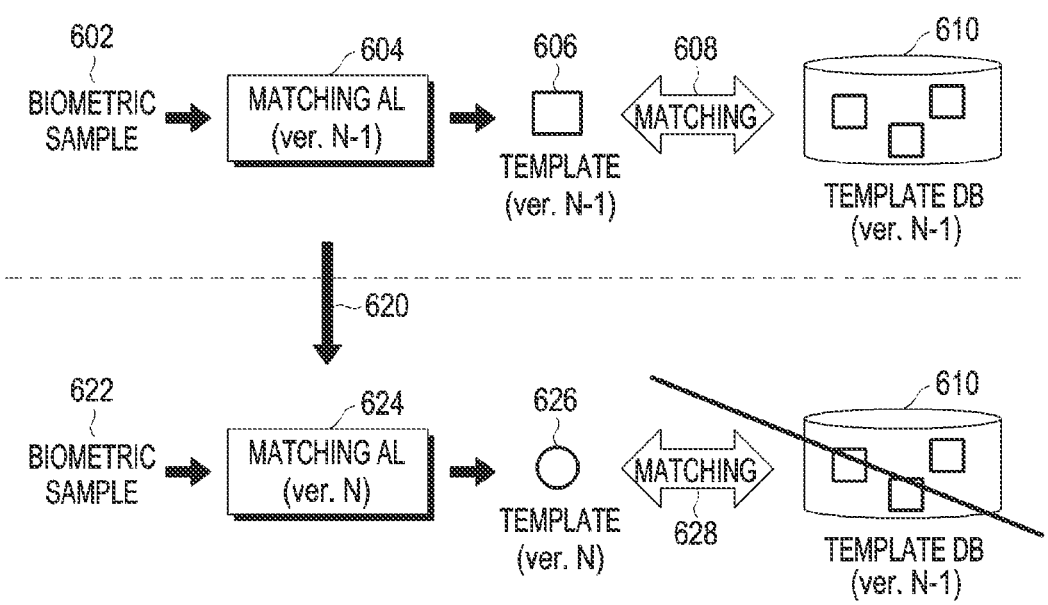
FIG. 6 is a view illustrating an update of a matching algorithm according to various embodiments of the disclosure.

FIG. 6 is a view illustrating an update of a matching algorithm for describing various embodiments of the disclosure.

Referring to FIG. 6, a matching algorithm 604 of version N−1, provided in an electronic device (e.g., the electronic device 101 illustrated in FIG. 1, the electronic device 300 of FIG. 3, or the electronic device 400 of FIG. 5) may generate a template 606 of version N−1 based on an input biometric sample 602 and may perform biometric authentication by determining whether the generated template 606 matches (608) templates stored in the template DB 610 of version N−1.

The version N−1 matching algorithm 604 may be updated 620 to a version N matching algorithm 624. In an embodiment, the processor (e.g., 120 of FIG. 1 or 410 of FIG. 4) of the electronic device may perform a software update including the version N matching algorithm 624 and may replace the version N−1 matching algorithm 604 with the version N matching algorithm 624.

The version N matching algorithm 604 may generate a version N template 626 based on the input biometric sample 622. However, since there are currently no version N templates currently stored in the template DB 610, the version N matching algorithm 624 may determine whether the generated template 626 matches (628) the templates stored in the existing version N−1 template DB 610. Thus, biometric authentication may fail.

As described above, after the existing matching algorithm is deleted and the new matching algorithm is reinstalled (updated), normal biometric authentication is not possible until the re-registration of new templates corresponding to the new matching algorithm. Thus, user inconvenience occurs due to authentication failure. To prevent such inconvenience, it is inconveniently needed to re-register the user's reference biometric information before using the new matching algorithm. Due to the abnormal operation of biometric authentication and user inconvenience as described above, the developer has a limitation in developing a matching algorithm not to change the template DB in maintenance and repair of the biometric authentication system.

The embodiments described below may allow for enhanced biometric authentication accuracy and performance and an enhanced user experience without user inconvenience through an appropriate update procedure of a matching algorithm in terms of maintenance and management of the biometric authentication system.

Figure 7A:
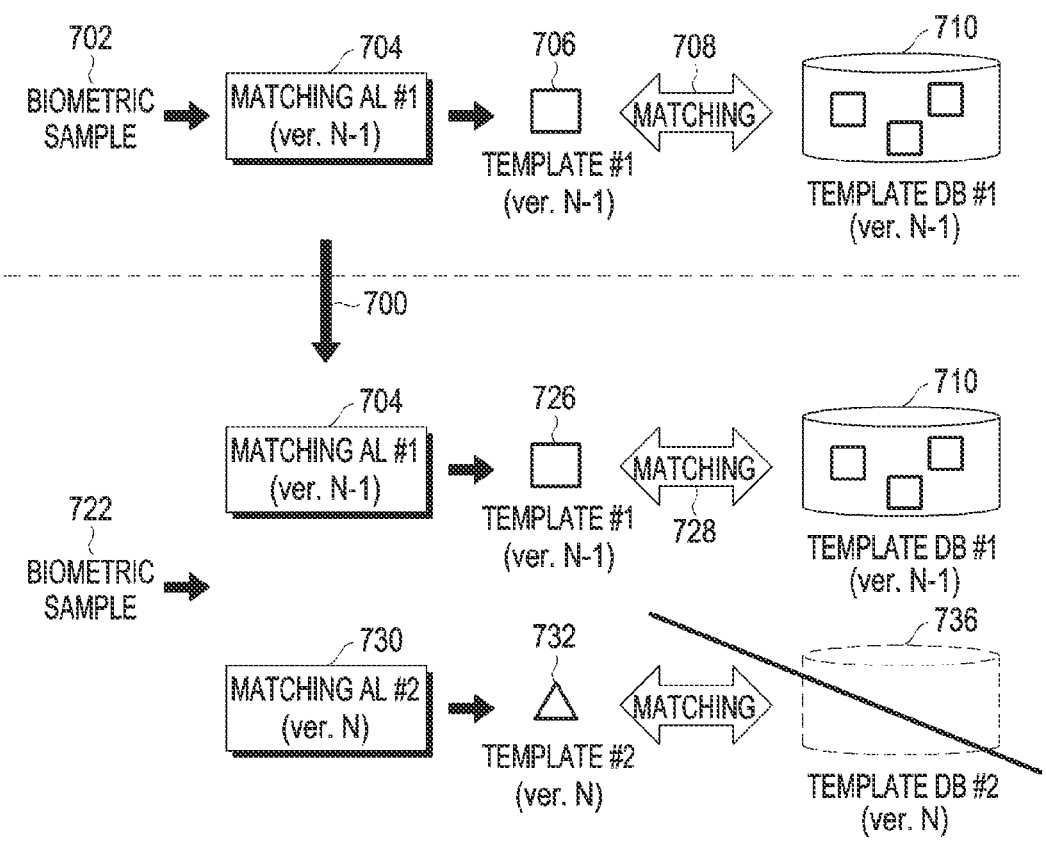
FIGS. 7A, 7B, and 7C are views illustrating an update of a matching algorithm for biometric authentication according to various embodiments of the disclosure.
Figure 7B:
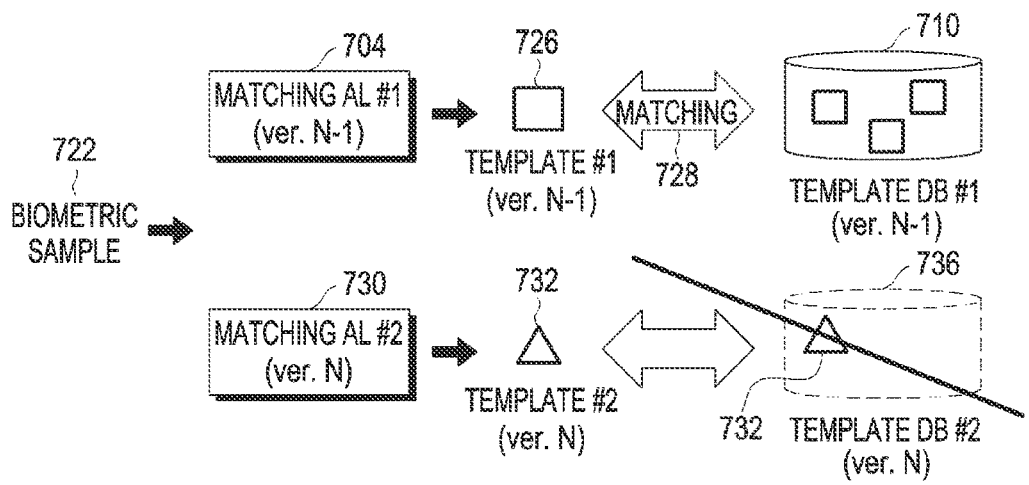
Figure 7C:
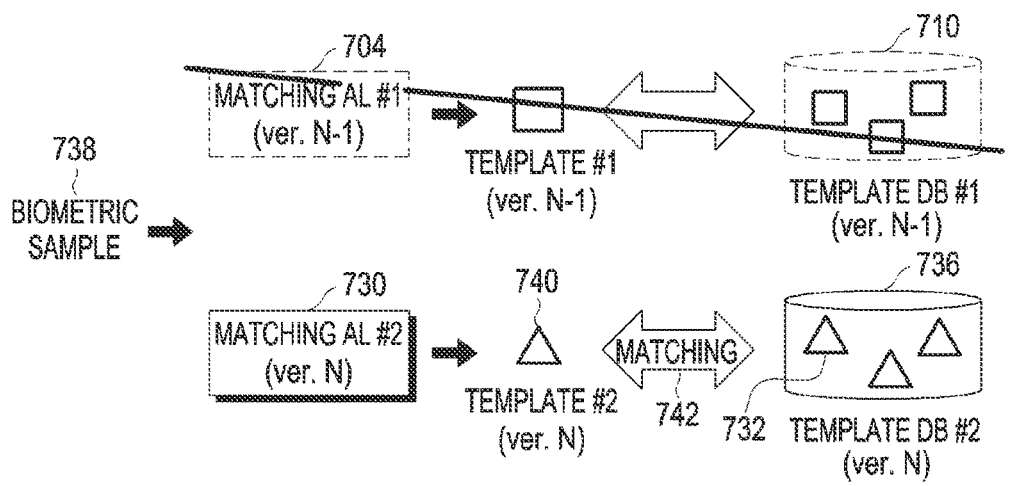

FIGS. 7A, 7B, and 7C are views illustrating an update of a matching algorithm for biometric authentication according to an embodiment of the disclosure. The illustrated procedure may be performed by a processor (e.g., 120 of FIG. 1 or 410 of FIG. 4) in an electronic device (e.g., 101 of FIG. 1, 300 of FIG. 3, or 400 of FIG. 4), as an example. Here, an example of updating a matching algorithm #1 704 to a matching algorithm #2 730 is illustrated. Here, the matching algorithm #2 730 is one enhanced from the matching algorithm #1 704. For example, the matching algorithm #1 704 may be of version N−1, and the matching algorithm #2 730 may be of version N. For example, the matching algorithm #2 730 of version N may be one resultant from enhancing the reliability of the matching algorithm #1 704 or may provide a biometric authentication function with superior authentication performance in other user environments (e.g., low/high illuminance or high blur/noise) as compared with the matching algorithm #1 704. For example, the matching algorithm #2 730 of version N may use another biometric authentication scheme having better security than the matching algorithm #1 704.

Referring to FIG. 7A, the version N−1 matching algorithm #1 704 executed by the processor 120 may generate the version N−1 template 706 based on the input biometric sample 702 and may perform biometric authentication by determining whether the generated template 706 matches (708) templates stored in the template DB #1 710 of version N−1.

An update 700 from the matching algorithm #1 704 to the version N matching algorithm #2 724 may be required. In one embodiment, the processor 120 may perform a software update including the version N matching algorithm #2 730 and may perform the following operations.

The processor 120 may temporarily maintain the existing matching algorithm #1 704 and the template DB #1 710 and may additionally install a new matching algorithm #2 730 and a template DB #2 736. Specifically, the processor 120 may install the matching algorithm #2 730 and may secure a storage area for the template DB #2 736 in the memory (e.g., 130 or 440). As an example, the template DB #2 736 may be empty immediately after the update 700. In this case, the template DB #2 736 may be set to an inactive state (or may be referred to as a disabled state), and biometric authentication is performed by the matching algorithm #1 704 and the template DB #1 710. Here, the matching algorithm #1 704 used for actual biometric authentication may be referred to as a reference or primary matching algorithm.

If a biometric sample 722 is input after the update 700, the matching algorithm #1 704 may generate the template #1 726 based on the input biometric sample 722. Biometric authentication may be performed by determining whether the generated template #1 726 matches (728) templates stored in the template DB #1 710. Further, the matching algorithm #2 730 may generate the template #2 732 based on the biometric sample 722. However, the template DB #2 736 is in the inactive state, and matching on the template #2 732 may not be performed.

If biometric authentication is successful as a result of matching 728 by the matching algorithm #1 704, then the template #2 732 generated by the matching algorithm #2 730 may be additionally registered and stored in the template DB #2 736 as illustrated in FIG. 7B. In this case, a predetermined template registration condition may be considered to store the template #2 732 in the template DB #2 736. In an embodiment, the template registration condition may be determined to enhance the reliability of the template DB #2 736 and to ensure the authentication performance of the matching algorithm #2 730. The template registration condition is described below in detail.

Whenever biometric authentication by the matching algorithm #1 704 is performed, the operation of registering a template in the template DB #2 736 may be repeated until a predetermined template activation condition (or also referred to as a template enable condition) is met, and the template DB #2 736 maintains the inactive state. The template activation condition is described below in detail.

If the template activation condition for the template DB #2 736 is met, the matching algorithm #1 704 and the template DB #1 710 may be deactivated and removed as shown in FIG. 7C and the template DB #2 736 is simultaneously activated. If the template DB #2 736 is activated, the processor 120 may perform biometric authentication using the matching algorithm #2 730 and the template DB #2 736. Specifically, the matching algorithm #2 730 may generate a template #2 740 based on an input biometric sample 738 and may perform biometric authentication by determining whether the generated template 740 matches (742) templates stored in the template DB #2 736. Template compatibility processing may be completed through the above-described series of operations.

As an embodiment, in FIG. 7C, the processor 120 does not deactivate or remove the matching algorithm #1 704 and the template DB #1 710 but, together with the matching algorithm #2 730 and the template DB #2 736, may operate as a multi-matching authentication system.

Multi-matching authentication may use, in biometric authentication, a combination of a plurality of matching results by a plurality of matching algorithms 704 and 730. In an embodiment, a scheme for combining the matching results is determined as follows according to a mode set in the electronic device.

In a usability enhancement mode, the processor 120 may determine that the biometric authentication is successful if the matching result by the matching algorithm #1 704 is successful or if the matching result by the matching algorithm #2 730 is successful. In an embodiment, the processor 120 may preferentially perform matching by a matching algorithm (e.g., 730) with higher priority among the plurality of matching algorithms 704 and 730 and, if authentication fails, the processor 120 may perform matching by a matching algorithm (e.g., 704) with lower priority. As such, the priority between the matching algorithms is used because a matching algorithm with higher priority has the highest recognition accuracy in terms of efficiency of authentication time.

In a security enhancement mode, the processor 120 may determine that the biometric authentication is successful when the matching result by the matching algorithm #1 704 is successful and the matching result by the matching algorithm #2 730 is successful.

Figure 8:
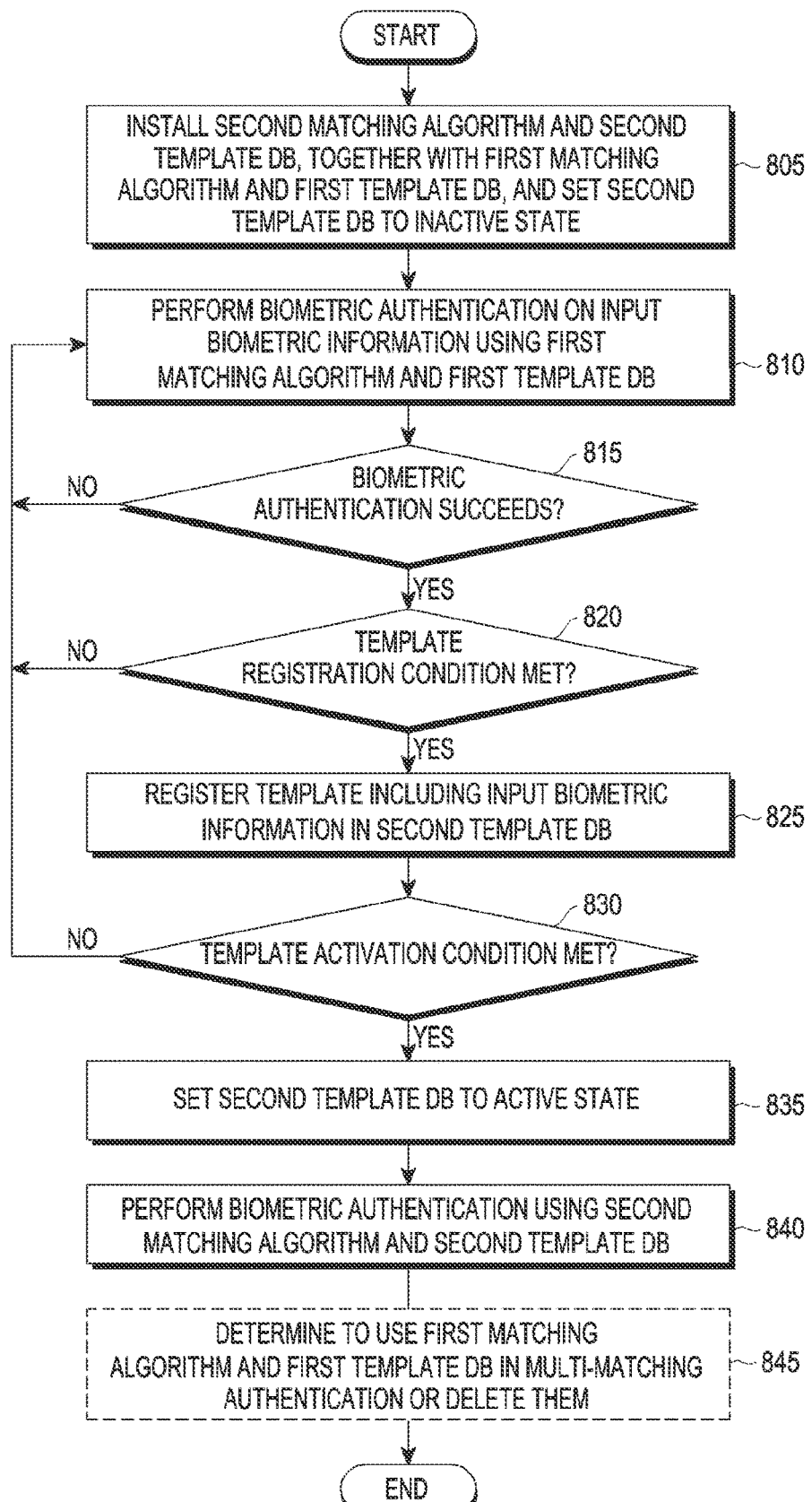
FIG. 8 is a flowchart illustrating an update procedure of a matching algorithm for biometric authentication according to an embodiment of the disclosure.

FIG. 8 is a flowchart illustrating an update procedure of a matching algorithm for biometric authentication according to an embodiment of the disclosure.

Referring to FIG. 8, in operation 805, the processor 120 may install a second matching algorithm and a second template DB, together with a first matching algorithm and a first template DB already installed, and may set the second template DB to an inactive state. Here, installing the second template DB means securing a storage space for the second template DB in a memory (e.g., 130 of FIG. 1 or 440 of FIG. 4) considering the maximum number of templates that may be stored in the second template DB. In an embodiment, the second matching algorithm is one enhanced from the first matching algorithm and may refer to, e.g., an algorithm upgraded compared with the first matching algorithm. In an embodiment, the second matching algorithm may be another matching algorithm similar to the first matching algorithm. In an embodiment, the second matching algorithm may be a matching algorithm that implements a different type of biometric authentication from the first matching algorithm. In an embodiment, the second matching algorithm may be a matching algorithm that uses a different type of biometric information from the first matching algorithm.

In operation 810, the processor 120 may perform biometric authentication on the input biometric information using the first matching algorithm and the first template DB. In one embodiment, the first matching algorithm may generate a first template based on biometric samples extracted from input biometric information and compare the generated first template with templates stored in the first template DB, calculating the matching similarity. In an embodiment, the matching similarity may be the maximum similarity or average similarity among the similarities between the first template and the stored templates. In an embodiment, the matching similarity may be a representative value derived from the similarities between the first template and the stored templates. If the matching similarity is larger than a predetermined threshold, it may be determined that biometric authentication is successful.

In operation 815, the processor 120 may determine whether biometric authentication based on the first template has been successful, and may return to operation 810 if it is not successful, but, if successful, proceed to operation 820.

In operation 820, the processor 120 may determine whether a predetermined template registration condition is met. The template registration condition may be related to a first template generated by the first matching algorithm. As an example, the template registration condition may be related to a second template generated by a second matching algorithm using the input biometric information of the successful biometric authentication. The template registration condition may be related to sample quality for the input biometric information of the successful biometric authentication. If the template registration condition is not met, the process returns to operation 810. On the other hand, if it is determined that the template registration condition is met, operation 825 proceeds.

In operation 825, the processor 120 may register the second template including the input biometric information of the successful biometric authentication in the second template DB. As an embodiment, the second template may be generated by the second matching algorithm using the same input biometric information substantially simultaneously with the authentication operation by the first matching algorithm in operation 810. As an embodiment, if it is determined that authentication by the first matching algorithm is successful in operation 815, the second template may be generated by the second matching algorithm using the same input biometric information.

In operation 830, after the second template is registered in the second template DB, the processor 120 may determine whether a template activation condition for the second template DB is met. If the template activation condition is not met, the process may return to operation 810, but, if met, the process may proceed to operation 835. It has been described herein that whenever the second template is registered in the second template DB, it is determined whether the template activation condition for the second template DB is met. However, in another embodiment, the processor 120 may determine the template activation condition whenever a new template is registered in the second template DB, whenever a predetermined number of templates are registered, every predetermined period, or according to other conditions.

In operation 835, the processor 120 may set the second template DB, which meets the template activation condition, to an active state. The processor 120, in operation 840, may perform biometric authentication using the second matching algorithm and the activated second template DB. In some embodiments, in operation 845, the processor 120 may determine to use the first matching algorithm and the first template DB, together with the first matching algorithm and the second template DB, in multi-matching authentication. As an embodiment, in operation 835, the processor 120 may deactivate or delete the first matching algorithm and the first template DB when the second template DB is activated.

The aforementioned template registration condition is a basis for determining whether to add a template to the second template DB upon successful biometric authentication, and as an embodiment, the template registration condition may be determined based on the first template generated using the first matching algorithm, and/or based on the second template generated using the second matching algorithm, and/or based on the sample quality of the input biometric information.

Figure 9:
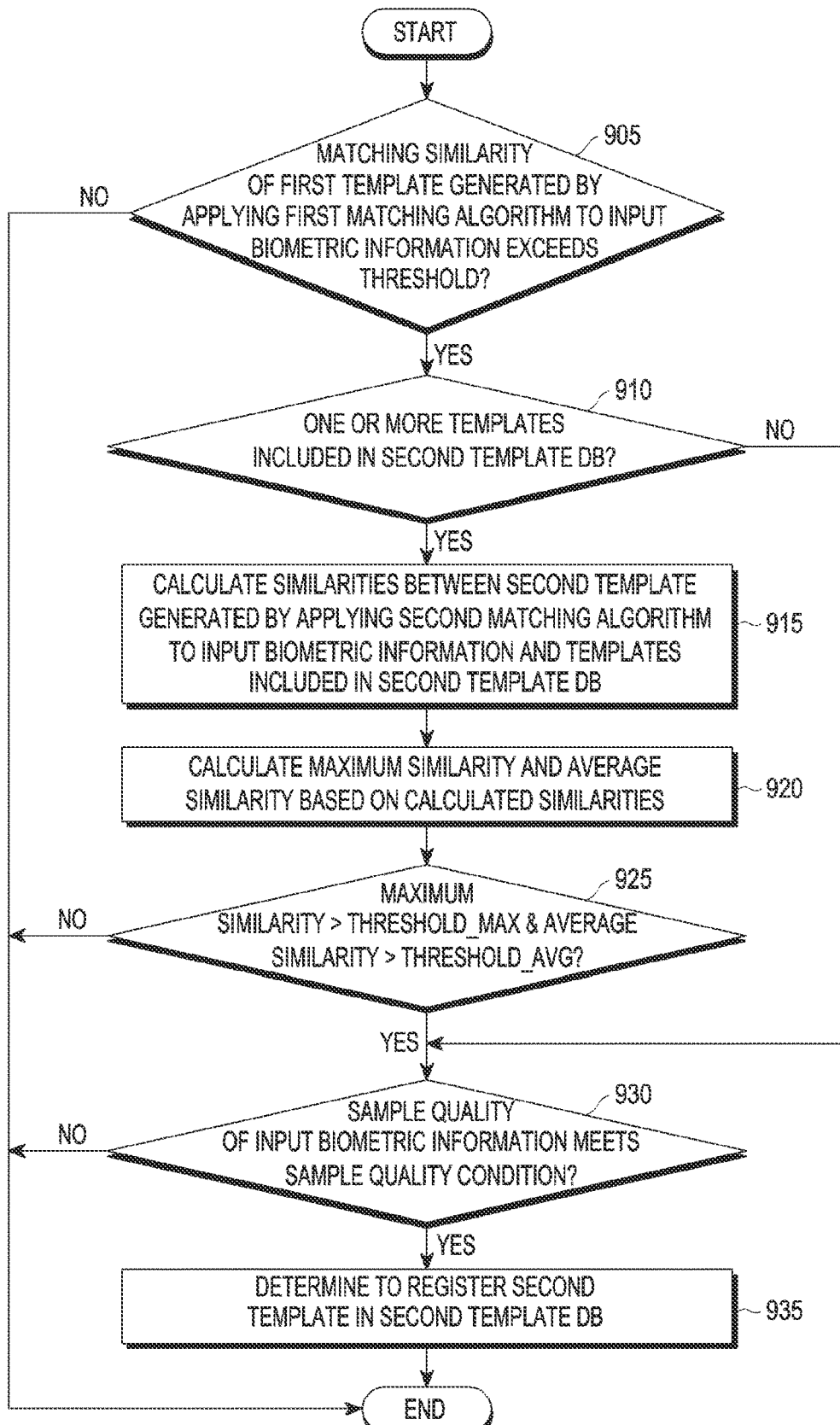
FIG. 9 is a flowchart illustrating a procedure for determining a template registration condition according to an embodiment of the disclosure.

FIG. 9 is a flowchart illustrating a procedure for determining a template registration condition according to an embodiment of the disclosure.

Referring to FIG. 9, in operation 905, the processor 120 may determine whether the matching similarity of the first template generated by applying the first matching algorithm to the input biometric information exceeds a predetermined threshold. The matching similarity may be the maximum similarity or average similarity among the similarities between the first template and the stored templates. In an embodiment, the matching similarity may be a representative value derived from the similarities between the first template and each of the stored templates.

Here, the threshold used for the template registration condition may be set to a value larger than the threshold used for determining whether biometric authentication is successful. In other words, the following equation may be used.

$$\text{Similarity\_\#1} > \text{Threshold\_\#1\_strong} > \text{Threshold\_\#1\_verify}$$

Here, Similarity_#1 denotes the matching similarity for the first template, and Threshold_#1_verify is used to determine whether biometric authentication succeeds. Threshold_#1_strong is a value used to determine the reliability of the first template and may be set to a value larger than Threshold_#1_verify.

As an embodiment, if the matching similarity is larger than the threshold Threshold_#1_strong, the processor 120 may omit subsequent operations 910 to 930 and may determine to add the above-described second template to the second template DB in operation 935. As an optional embodiment, if the matching similarity is larger than the threshold Threshold_#1_strong, the processor 120 may perform subsequent operations 910 to 930. As another optional embodiment, if the matching similarity is larger than the threshold Threshold_#1_strong, the processor 120 may perform operations 910 to 925. As another optional embodiment, if the matching similarity is larger than the threshold Threshold_#1_strong, the processor 120 may proceed to operation 930.

In operation 910, the processor 120 may determine whether one or more templates are included in the second template DB. If one or more templates are not stored in the second template DB, that is, if there is no template or only one template, the processor 120 may proceed to operation 930 to determine a sample quality condition. On the other hand, if one or more templates are stored, the processor 120 may proceed to operation 915. As an embodiment, if the matching similarity is larger than the threshold in operation 905, the processor 120 may proceed to operation 930 to determine the sample quality condition. As an embodiment, if there is no template or only one template in the second template DB in operation 910, the processor 120 may determine that the template registration condition is not met and terminate the procedure.

In operation 915, the processor 120 may calculate similarities between the second template, generated by applying the second matching algorithm to the input biometric information, and templates included in the second template DB. The processor 120, in operation 920, may calculate the maximum similarity and the average similarity based on the calculated similarities in operation 920. In operation 925, the processor 120 may determine whether the maximum similarity is larger than a predetermined threshold Threshold_max and the average similarity is larger than a predetermined threshold Threshold_avg. In other words, the processor 120 may evaluate the following equation.

$$Similarity_{max} > Threshold\_max \ \&$$

$$Similarity_{avg} > Threshold\_avg$$

Here, $Similarity_{max}$ and $Similarity_{avg}$ mean the maximum similarity and average similarity, respectively, and may be calculated as in Equation 1 below as an embodiment.

$$Similarity_{max} = \max\{S_i \mid i = 1, 2, \ldots, N\} \quad \text{[Equation 1]}$$
$$Similarity_{avg} = \frac{1}{N} \sum_{i=1}^{N} S_i$$

Here, N means the number of templates stored in the second template DB, and Si means the similarity between the second template and the template $T_i$ stored in the second template DB. The similarity may be calculated according to various schemes, which are less relevant to the gist of embodiments of the disclosure and are thus omitted from the description.

As an embodiment, if the maximum similarity is larger than Threshold_max and the average similarity is larger than the threshold Threshold_avg, the processor 120 may omit the subsequent operation 930 and may determine to add the above-described second template to the second template DB in operation 935. As an optional embodiment, if the maximum similarity is larger than Threshold_max and the average similarity is larger than the threshold Threshold_avg, the processor 120 may proceed to operation 930.

In operation 930, the processor 120 may determine whether the sample quality of the input biometric information meets a predetermined sample quality condition. If the input biometric information includes a good sample meeting the sample quality condition, the processor 120 may determine to register the second template in the second template DB in operation 935.

The sample quality condition may mean having low blur and low noise. Specific examples of the sample quality condition are as follows according to the type of input biometric information.

Figure 10A:
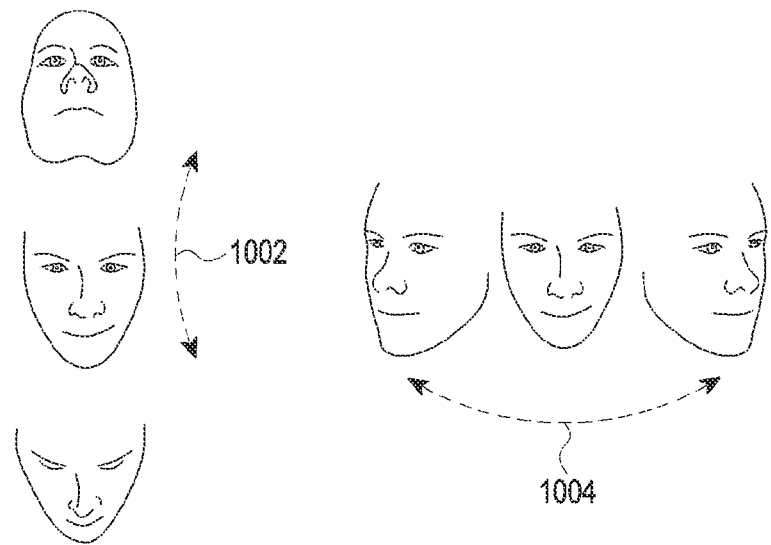
FIGS. 10A, 10B, 10C, and 10D are views illustrating a sample quality condition according to various embodiments of the disclosure.
Figure 10B:
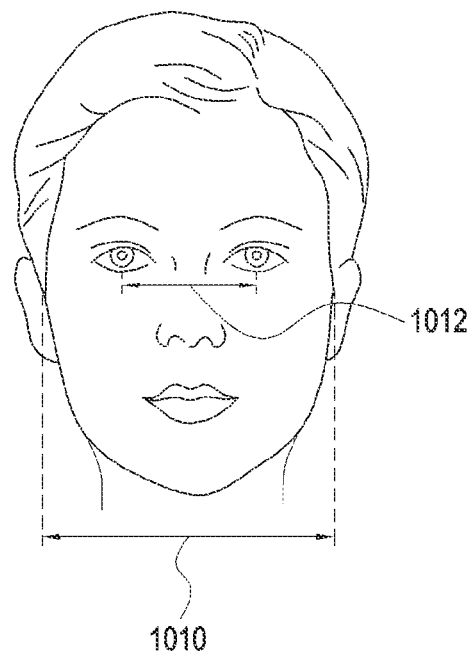
Figure 10C:
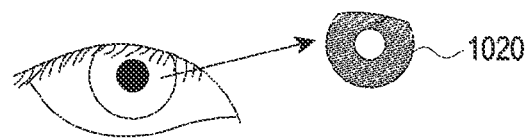
Figure 10D:
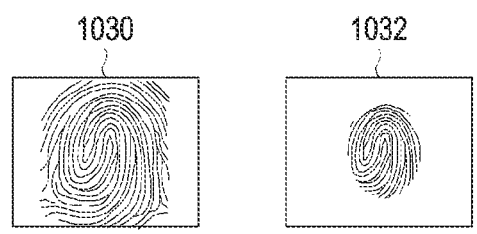

1. Face
  Non-occlusion: For example, no mask, no sunglasses, or no hat.
  Face pose: For example, as shown in FIG. 10A, the vertical angle (pitch) 1002 of the face is within +/−15 degrees and the left and right angle (yaw) 1004 is within +/−15 degrees.
  Distance: As an example, as shown in FIG. 10B, the face size 1010 is larger than a predetermined threshold, and/or the eye distance 1012 is larger than a predetermined threshold.
  Normal lighting: For example, it may be determined based on the exposure as camera metadata, a lighting sensor, and a face histogram.
2. Iris/fingerprint
  Valid iris area: For example, as shown in FIG. 10C, the size 1020 of the iris area is larger than a predetermined threshold.
  Valid fingerprint area: As an example, as shown in FIG. 10D, if the size 1030 of the fingerprint area is larger than a predetermined threshold, it may be determined that the sample quality is good and, if the size 1032 of the fingerprint area is not larger than the threshold, it may be determined that the sample quality is not good.

The aforementioned template activation condition is a basis for determining whether to set the second template DB, which is in the inactive state, to the active state and, as an embodiment, may be determined based on the number of templates stored in the second template DB and/or may be determined based on the diversity of templates stored in the second template DB.

Figure 11:
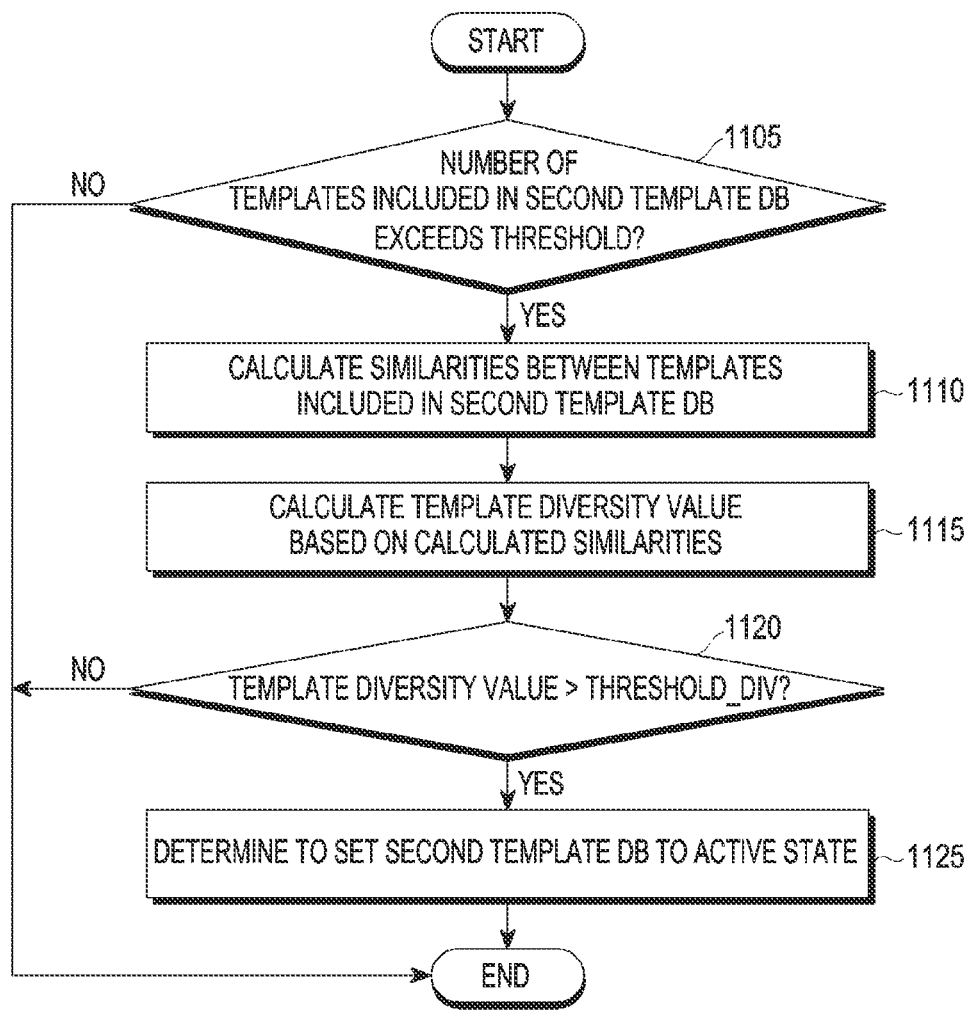
FIG. 11 is a flowchart illustrating a procedure for determining a template activation condition according to an embodiment of the disclosure.

FIG. 11 is a flowchart illustrating a procedure for determining a template activation condition according to an embodiment of the disclosure.

Referring to FIG. 11, in operation 1105, the processor 120 may determine whether the number of templates included in the second template DB exceeds a predetermined threshold. If the number of templates included in the second template DB is larger than the threshold, the procedure proceeds to operation 1110; otherwise, the procedure ends. As a modified embodiment, if the number of templates included in the second template DB is larger than the threshold in operation 1105, the processor 120 may skip operations 1110 and 1120 and proceed to operation 1125.

The processor 120 may calculate similarities between templates included in the second template DB in operation 1110, and calculate a template diversity value based on the calculated similarities in operation 1115. As an example, the template diversity value may be calculated using Equation 2 below.

$$\text{Template diversity} = \frac{NN}{\sum_{i=1}^{N}\sum_{j=1}^{N} S_{ij}} > \text{Threshold}_{div} \quad \text{[Equation 2]}$$

Here, N means the number of templates stored in the second template DB, and $S_{ij}$ means the similarity between ith template $T_i$ and the ith template $T_j$ among the templates stored in the second template DB.

In operation 1120, the processor 120 may determine whether the calculated template diversity value is larger than a predetermined threshold Threshold_div and, if larger, the processor 120 may proceed to operation 1125 and, otherwise, end the procedure.

In operation 1125, the processor 120 may determine to set the second template DB to the active state. If the second template DB is set to the active state according to the above determination, biometric authentication is enabled by the second matching algorithm and the second template DB as described in connection with operation 940 of FIG. 9.

Figure 12:
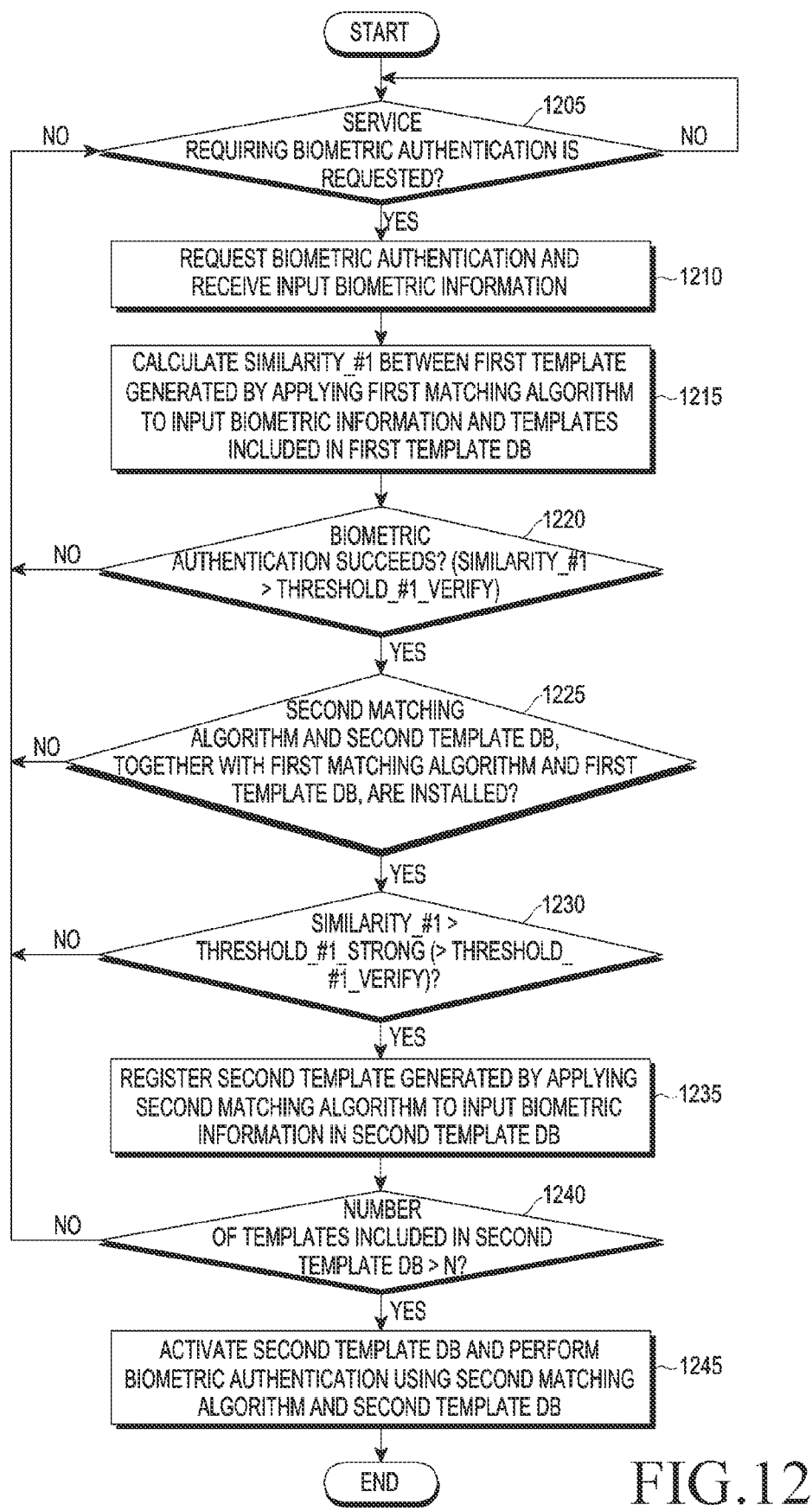
FIG. 12 is a flowchart illustrating a procedure for performing biometric authentication according to an embodiment of the disclosure.

FIG. 12 is a flowchart illustrating a procedure for performing biometric authentication according to an embodiment of the disclosure.

Referring to FIG. 12, in operation 1205, the processor 120 may determine whether a request to execute a service requiring biometric authentication (e.g., a purchase or financial service) is received and, if biometric authentication is necessary, may proceed to operation 1210. If biometric authentication is not required, the processor 120 may return to operation 1205.

In operation 1210, the processor 120 may transmit a biometric authentication request for executing the service to the user and receive input biometric information from the user. In operation 1215, the processor 120 may generate a first template by applying a first matching algorithm to the input biometric information and calculate the similarity_#1 between the first template and the templates included in the first template DB.

In operation 1220, the processor 120 may determine whether biometric authentication is successful based on the similarity_#1. In an embodiment, if the similarity_#1 is larger than Threshold_#1_verify, the processor 120 may determine that biometric authentication has succeeded and proceed to operation 1225. If the biometric authentication fails, the processor 120 may return to operation 1205.

In operation 1225, the processor 120 may determine whether a second matching algorithm and a second template DB additionally installed exist along with the first matching algorithm and the first template DB used for biometric authentication in operation 1215. If no additionally installed matching algorithm and inactive template DB exist, the processor 120 may return to operation 1205. If the second matching algorithm and the second template DB exist, the processor 120 may proceed to operation 1230. In an embodiment, the second matching algorithm may be a different algorithm from the first matching algorithm or may be the same type of algorithm having further enhanced performance and/or a higher version than the first matching algorithm. As an embodiment, instead of omitting operation 1225, in operation 1220, if recognizing the existence of the second matching algorithm related to the inactive second template DB along with the existence of the first matching algorithm with higher priority and the active first template DB, the processor 120 may determine to perform biometric authentication using only the first matching algorithm and the first template DB without using the second matching algorithm and the second template DB.

In operation 1230, the processor 120 may determine whether the similarity_#1 is larger than Threshold_#1_strong. Here, Threshold_#1_strong may be a value determined to be larger than Threshold_#1_verify.

If the similarity_#1 is larger than Threshold_#1_strong, in operation 1235, the processor 120 may generate a second template by applying the second matching algorithm to the input biometric information and register the second template in the second template DB. As an embodiment, the second template may be generated substantially simultaneously with the first template in operation 1220 and may be added to the second template DB in operation 1235. As an embodiment, if the similarity_#1 is larger than Threshold_#1_strong, the processor 120 may perform operations 910 to 930 of FIG. 9 and proceed to operation 1235 according to a result of the performing. As an embodiment, if the similarity_#1 is larger than Threshold_#1_strong, the processor 120 may perform operations 910 to 925 or 930 of FIG. 9 and proceed to operation 1235 according to a result of the performing.

In operation 1240, the processor 120 may determine whether the number of templates included in the second template DB is larger than a predetermined maximum value N and, if so, proceed to operation 1245. If not, the processor 120 may return to operation 1205. As an embodiment, if the number of templates included in the second template DB is larger than the predetermined maximum value N, the processor 120 may perform operations 1110 to 1120 of FIG. 11 and may proceed to operation 1245 according to the result of the performing.

In operation 1245, the processor 120 may switch the second template DB to the active state and, if biometric authentication is required in the future, determine to perform biometric authentication using the second matching algorithm and the second template DB. As an embodiment, the processor 120 may determine to use the first matching algorithm and the first template DB together with the second matching algorithm and the second template DB in multi-matching authentication. As an embodiment, the processor 120 may delete the first matching algorithm and the first template DB.

Hereinafter, embodiments in which multi-matching authentication is operated are described.

Figure 13:
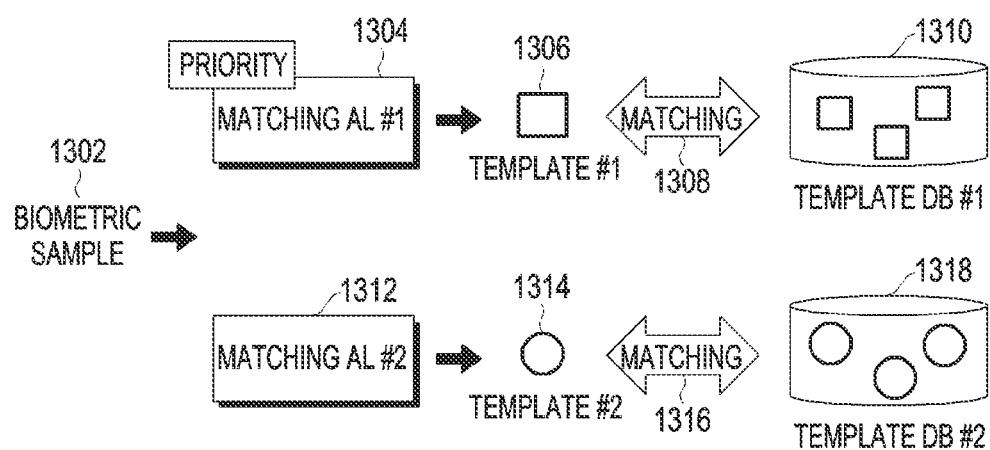
FIG. 13 is a view illustrating multi-matching authentication according to an embodiment of the disclosure.

FIG. 13 is a view illustrating multi-matching authentication according to an embodiment of the disclosure.

Referring to FIG. 13, a matching algorithm #1 1304 and a matching algorithm #2 1312 are installed on an electronic device (which may correspond to, e.g., the electronic device 101 of FIG. 1, the electronic device 300 of FIG. 3, or the electronic device 400 of FIG. 5), and a template DB #1 1310 corresponding to the matching algorithm #1 1304 and a template DB #2 1318 corresponding to the matching algorithm #2 are stored therein. The matching algorithm #1 1304 may generate a template #1 1306 based on an input biometric sample 1302 and may determine whether the generated template #1 1306 matches (1308) the templates stored in the template DB #1 1310. Similarly, the matching algorithm #2 1312 may generate a template #2 1314 based on the biometric sample 1302 and may determine whether the generated template #2 1314 matches (1316) the templates stored in the template DB #2 1318.

In one embodiment, the matching 1308 may determine whether the matching similarity obtained by comparing the template #1 1306 and the templates stored in the template DB #1 1310 is larger than a predetermined threshold (e.g., Threshold_verify1). Likewise, the matching 1316 may determine whether the matching similarity obtained by comparing the template #2 1314 and the templates stored in the template DB #2 1318 is larger than a predetermined threshold (e.g., Threshold_verify2).

In one embodiment, the result of biometric authentication may be determined by combining (e.g., OR or AND) results of the matching 1308 and 1316 of the matching algorithms 1304 and 1312. For example, if an OR operation is performed on the matching results of the matching algorithms 1304 and 1312 according to the usability enhancement mode, that is, if at least one of the results of matching 1308 and 1316 of the matching algorithms 1304 and 1312 is successful, it may be determined that authentication is successful. For example, if an AND operation is performed on results of the matching 1308 and 1316 of the matching algorithms 1304 and 1312 according to the security enhancement mode, that is, if results of the matching 1308 and 1316 of the matching algorithms 1304 and 1312 both are successful, it may be determined that authentication is successful. Similarly, if more than two matching algorithms are used, the above-described method of combining the matching results may be similarly used.

In the illustrated example, the matching algorithm #1 1304 may be set as a primary algorithm. The primary matching algorithm #1 1304 may perform matching before the matching algorithm #2 1312 in a case where an OR operation for the matching results according to the usability enhancement mode is used. As an embodiment, the one having the highest recognition accuracy of the matching algorithm #1 1304 and the matching algorithm #2 1312 may be set to have priority.

Described below are embodiments of updating at least one matching algorithm to a new matching algorithm in a multi-matching authentication system including two matching algorithms. However, the following description is also applicable to a multi-matching authentication system including more than two matching algorithms.

Figure 14A:
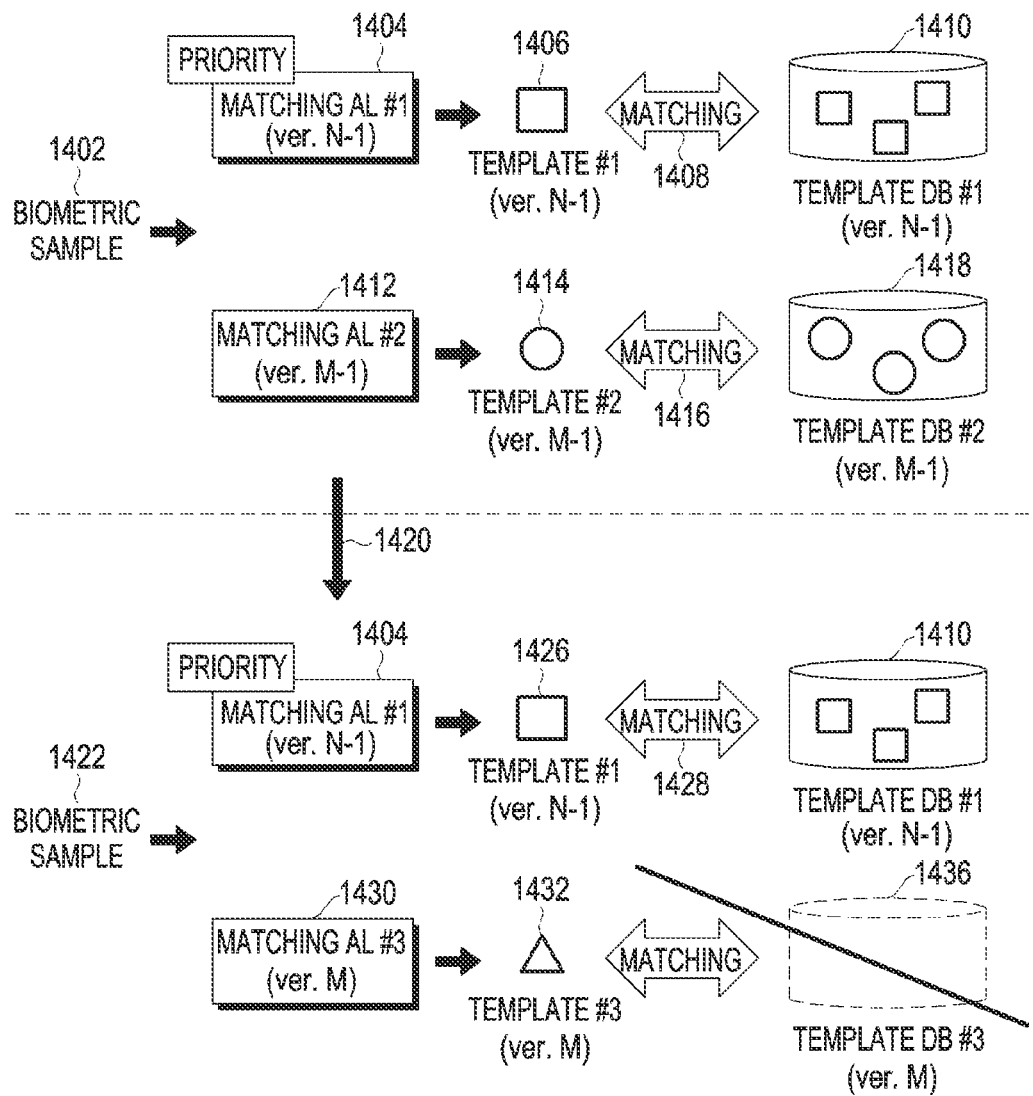
FIGS. 14A, 14B, and 14C are views illustrating an update procedure of a matching algorithm in a multi-matching authentication system according to various embodiments of the disclosure.
Figure 14B:
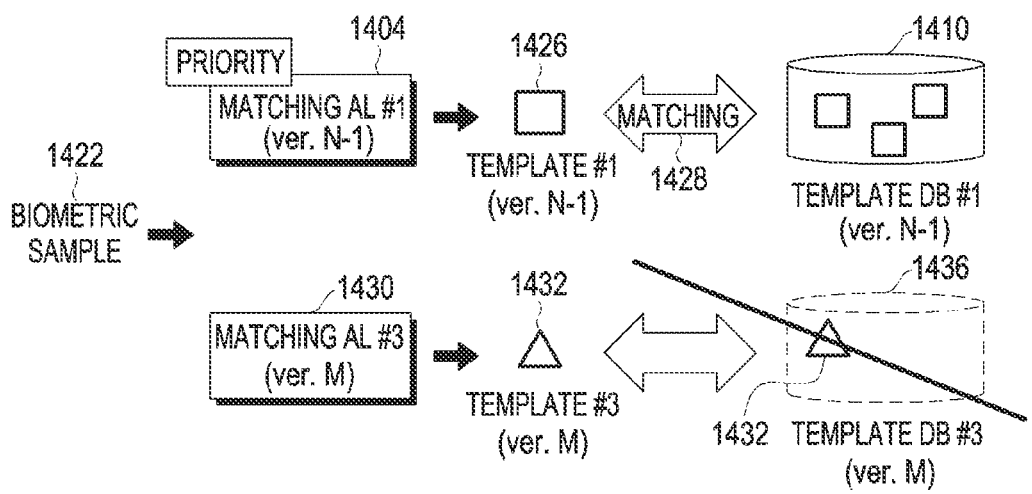
Figure 14C:
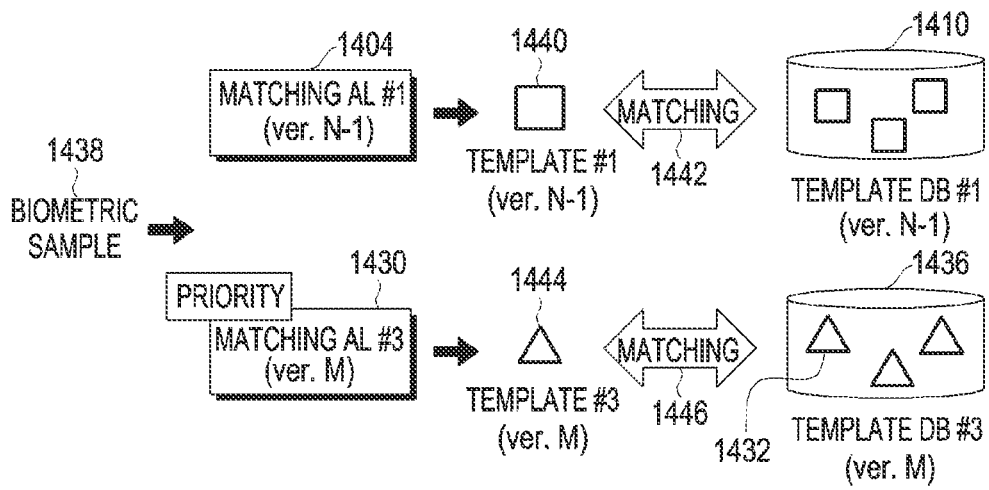

FIGS. 14A, 14B, and 14C are views illustrating an update procedure of a matching algorithm in a multi-matching authentication system according to an embodiment of the disclosure. The illustrated procedure may be performed by a processor (e.g., 120 of FIG. 1 or 410 of FIG. 4) in an electronic device (e.g., 101 of FIG. 1, 300 of FIG. 3, or 400 of FIG. 4), as an example.

Illustrated therein is an example of updating a matching algorithm #2 1412 to a matching algorithm #3 1430 in a multi-authentication matching system including a matching algorithm #1 1404 and the matching algorithm #2 1412. Here, the matching algorithm #3 1430 is one enhanced from the matching algorithm #2 1412. For example, the matching algorithm #2 1412 may be of version M−1, and the matching algorithm #3 1430 may be of version M. For example, the matching algorithm #3 1430 of version M may be one resultant from enhancing the reliability of the matching algorithm #2 1412 or may provide a biometric authentication function with superior authentication performance in other user environments as compared with the matching algorithm #2 1412. For example, the matching algorithm #3 1430 of version M may use another biometric authentication scheme having better security than the matching algorithm #2 1412.

Referring to FIG. 14A, the version N−1 matching algorithm #1 1404 executed by the processor 120 may generate the version N−1 template 1406 based on the input biometric sample 1402 and determines whether the generated template 1406 matches (1408) templates stored in the template DB #1 1410 of version N−1. Likewise, the version M−1 matching algorithm #2 1412 may generate the version M−1 template 1414 based on the biometric sample 1402 and determine whether the generated template 1414 matches (1416) templates stored in the template DB #2 1418 of version M−1. The result of biometric authentication may be determined by combining (e.g., OR operation or AND operation) the matching results 1408 and 1416 of the matching algorithms 1404 and 1412.

An update 1420 from the version M−1 matching algorithm #2 1412 to the version M matching algorithm #3 1430 may be required. In one embodiment, the processor 120 may perform a software update including the version M matching algorithm #3 1430 and may perform the following operations.

The processor 120 may maintain the existing primary matching algorithm #1 1404 and the template DB #1 1410 and install a new matching algorithm #3 1430 and a template DB #3 1436 to replace the matching algorithm #2 1412 and the template DB #2 1418. In one embodiment, the processor 120 may install the matching algorithm #3 1430 and may secure a storage area for the template DB #3 1436 in the memory (e.g., 130 of FIG. 1 or 440 of FIG. 4). As an example, the template DB #3 1436 may be empty immediately after the update 1420. In this case, the template DB #3 1436 is set to an inactive state, and biometric authentication is performed by the matching algorithm #1 1404 and the template DB #1 1410. Here, the matching algorithm #1 1404 used for actual biometric authentication during the update procedure may be referred to as a reference or primary matching algorithm.

In one embodiment, after the matching algorithm #3 1430 and the template DB #3 1436 are installed, the matching algorithm #2 1412 and the template DB #2 1418 may be deleted to prevent unnecessary waste of storage space. In one embodiment, the matching algorithm #2 1412 and the template DB #2 1418 may be maintained inactive until a template activation condition to be described below is met and may be deleted when the template DB #3 1436 is activated so that the matching algorithm #3 1430 and the template DB #3 1436 start to be used.

If a biometric sample 1422 is input after the update 1420, the matching algorithm #1 1404 may generate the template #1 1426 based on the input biometric sample 1422. Biometric authentication may be performed by determining whether the generated template #1 1426 matches (1428) templates stored in the template DB #1 1410. In an embodiment, to maintain a security level in performing biometric authentication based on the matching 1428 of the template #1 1426, the template matching criterion may be reinforced as compared with the existing multi-matching authentication (e.g., FIG. 13). To reinforce the template matching criterion, the matching similarity calculated as a result of the matching 1428 of the template #1 1426 may be compared with a higher threshold (e.g., referred to as Threshold_verify1 temp) than the existing threshold (e.g., Threshold_verify1).

Further, the matching algorithm #3 1430 may generate the template #3 1432 based on the biometric sample 1422. However, the template DB #3 1436 is in the inactive state, and matching on the template #3 1432 may not be performed.

If biometric authentication is successful as a result of matching 1428 by the matching algorithm #1 1404, the template #3 1432 generated by the matching algorithm #3 1430 may be additionally registered and stored in the template DB #3 1436 as illustrated in FIG. 14B. In this case, the above-described template registration condition (e.g., the operations of FIG. 9) may be considered to store the template #3 1432 in the template DB #3 1436.

Whenever biometric authentication by the matching algorithm #1 1404 is performed, the operation of registering a template in the template DB #3 1436 may be repeated until the above-described template activation condition (e.g., the operations of FIG. 11) is met, and the template DB #3 1436 may maintain the inactive state.

If the template activation condition for the template DB #3 1436 is met, the template DB #3 1436 may be activated as shown in FIG. 14C, and the processor 120 may perform multi-matching authentication using the matching algorithm #1 1404 and the template DB #1 1410 and the matching algorithm #3 1430 and the template DB #3 1436 together. Specifically, the matching algorithm #1 1404 may generate the template #1 1440 based on the input biometric sample 1438 and perform matching 1442. The matching algorithm #3 1430 may generate the template #3 1444 based on the biometric sample 1438 and perform matching 1446. Biometric authentication may be performed by a combination of results of the matching 1442 and 1446 (e.g., an OR operation or an AND operation).

As an embodiment, in FIG. 14A, the processor 120 may maintain the matching algorithm #2 1412 and the template DB #2 1418 in an inactive state without removing them, and the matching algorithm #2 1412 and the template DB #2 1418 may be deleted when the template activation condition of the template DB #3 1436 is met.

As an embodiment, after the template DB #3 1436 is activated, one of the matching algorithm #1 1404 and the matching algorithm #3 1430 may be selected as a primary matching algorithm according to a predetermined priority change rule.

In an embodiment, the priority change rule may include at least one of the following detailed rules.

It is determined according to a priority predetermined for each matching algorithm. For example, a higher version of matching algorithm may have a higher priority. For example, a newly installed matching algorithm may have a higher priority.

It is determined according to the number of templates stored in each template DB. For example, a matching algorithm corresponding to a template DB having more templates may have a higher priority.

It is determined according to the matching success rate of each matching algorithm. For example, a matching algorithm having a higher matching success rate may have a higher priority.

Figure 15:
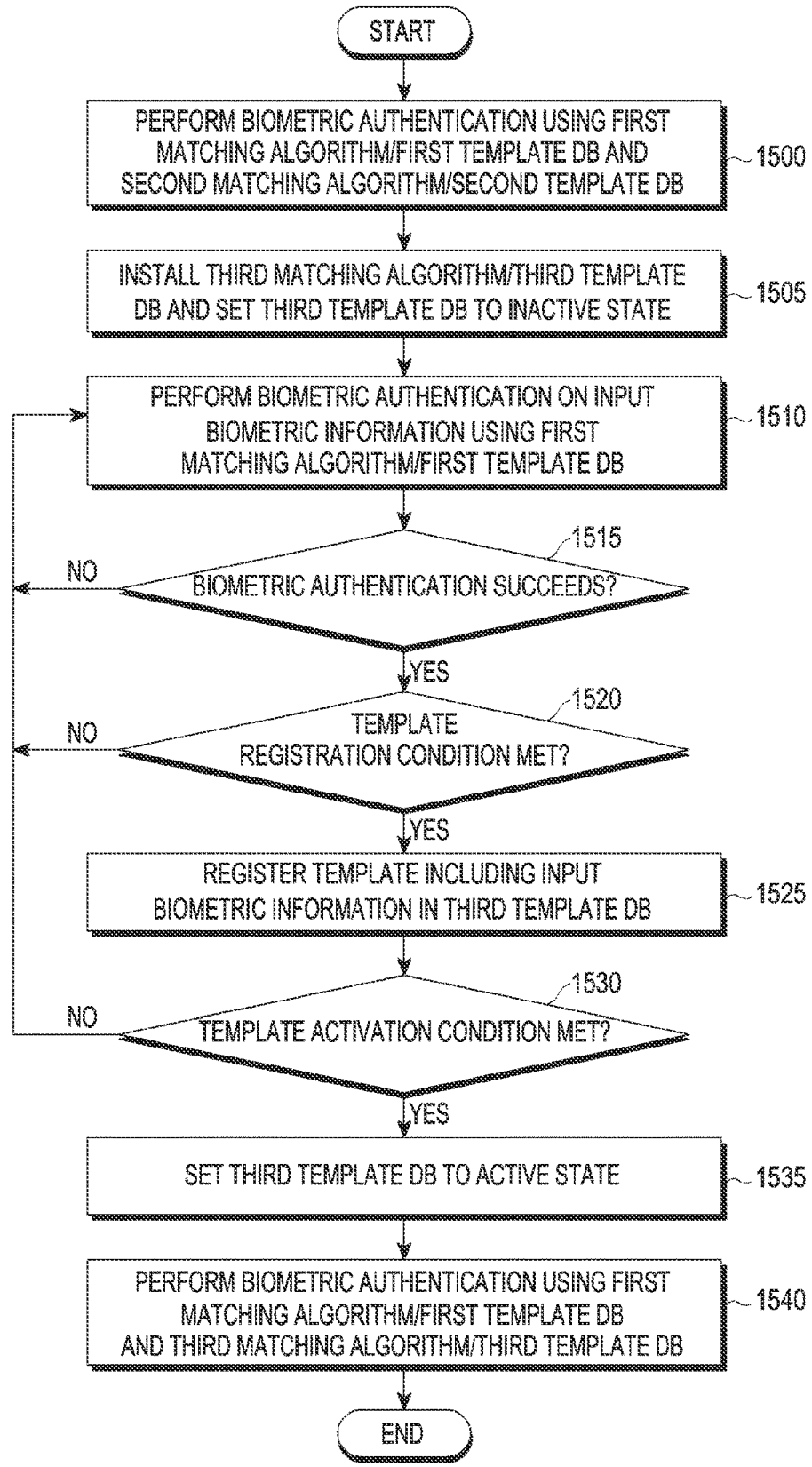
FIG. 15 is a flowchart illustrating an update procedure of a matching algorithm in an electronic device supporting multi-matching authentication according to an embodiment of the disclosure.

FIG. 15 is a flowchart illustrating an update procedure of a matching algorithm in an electronic device supporting multi-matching authentication according to an embodiment of the disclosure.

Referring to FIG. 15, in operation 1500, the processor 120 may perform biometric authentication according to multi-matching authentication using a first matching algorithm and a first template DB, and a second matching algorithm and a second template DB. In operation 1505, the processor 120 may install a third matching algorithm and a third template DB to replace the second matching algorithm and the second template DB and may set the third template DB to an inactive state. As an embodiment, the second matching algorithm and the second template DB may be deleted or set to an inactive state.

In operation 1510, the processor 120 may perform biometric authentication on the input biometric information using the first matching algorithm and the first template DB. Specifically, the first matching algorithm may generate a first template based on biometric samples extracted from input biometric information and compare the generated first template with templates stored in the first template DB, calculating the matching similarity. If the matching similarity is larger than a predetermined threshold, it may be determined that biometric authentication is successful.

In operation 1515, the processor 120 may determine whether biometric authentication based on the first template has been successful and may return to operation 1510 if it is not successful, but, if successful, proceed to operation 1520.

In operation 1520, the processor 120 may determine whether the above-described template registration condition (e.g., the procedure of FIG. 9) is met. If the template registration condition is not met, the processor 120 may return to operation 1510. On the other hand, if it is determined that the template registration condition is met, operation 1525 may proceed.

In operation 1525, the processor 120 may register the template including the input biometric information of the successful biometric authentication in the third template DB. The registered template may be generated using a third matching algorithm based on the input biometric information. As an embodiment, the template may be generated by the third matching algorithm using the same input biometric information substantially simultaneously with the authentication operation by the first matching algorithm in operation 1510. As an embodiment, if it is determined that authentication by the first matching algorithm is successful in operation 1515, the registered template may be generated by the third matching algorithm using the same input biometric information.

In operation 1530, the processor 120 may register the template in the third template DB and then determines whether a template activation condition (e.g., the procedure of FIG. 11) for the third template DB is met. If the template activation condition is not met, the process may return to operation 1510, but, if met, the process may proceed to operation 1535.

In operation 1535, the processor 120 may set the third template DB, which meets the template activation condition, to an active state and, in operation 1540, may perform biometric authentication, which uses multi-matching authentication, using the third matching algorithm and the activated third template DB along with the first matching algorithm and the first template DB. As an embodiment, if the second matching algorithm and the second template DB are not deleted but are in an inactive state, in operation 1535 the processor 120 may delete the second matching algorithm and the second template DB when the third template DB is activated.

According to various embodiments of the disclosure, an electronic device 400 may comprises a biometric sensor 420, a memory 440 storing at least one template database (DB) including templates representing biometric features, and at least one processor 410 operatively connected with the biometric sensor and the memory. Wherein the at least one processor may be configured to: perform biometric authentication using a first matching algorithm and a first template DB, the first template DB being among the at least one template DB, install a second matching algorithm and a second template DB, the second template DB being among the at least one template DB, set the second template DB to an inactive state, determine whether a predetermined template registration condition is met based on identifying the biometric authentication using the first matching algorithm and the first template DB is successful, in response to a determination that the template registration condition is met, generate a template including input biometric information of the successful biometric authentication and register the template in the second template DB in the inactive state, in response to identifying the second template DB meets a predetermined template activation condition, set the second template DB to an active state, and perform biometric authentication using the second matching algorithm and the second template DB in the active state.

According to an embodiment, the template registered in the second template DB may be generated, based on the input biometric information of the successful biometric authentication, using the second matching algorithm.

According to an embodiment, the template registration condition may include a condition where a matching similarity of the successful biometric authentication using the first matching algorithm and the first template DB is larger than a first threshold.

According to an embodiment, the template registration condition may include a condition where a maximum similarity between the generated template and templates included in the second template DB is larger than a second threshold, and an average similarity between the generated template and the templates included in the second template DB is larger than a third threshold. According to an embodiment, the template registration condition may include a condition where a sample quality of biometric samples included in the input biometric information meets a predetermined sample quality condition.

According to an embodiment, the template activation condition may include a condition where a number of templates included in the second template DB is larger than a first threshold. According to an embodiment, the template activation condition may include a condition where a template diversity value between the templates included in the second template DB is larger than a second threshold.

According to an embodiment, the at least one processor may be configured to, when the second template DB is set to the active state: replace the first matching algorithm and the first template DB with the second matching algorithm and the second template DB, respectively, and perform the biometric authentication using the second matching algorithm and the second template DB.

According to an embodiment, the at least one processor may be configured to: before the second matching algorithm and the second template DB are installed, perform biometric authentication using multi-matching authentication that uses a third matching algorithm and a third template DB, together with the first matching algorithm and the first template DB, and when the second template DB is set to the active state: replace the third matching algorithm and the third template DB with the second matching algorithm and the second template DB, respectively, and perform the biometric authentication using the multi-matching authentication.

According to an embodiment, the at least one processor may be configured to, when the third matching algorithm and the third template DB are replaced with the second matching algorithm and the second template DB, perform an operation of setting one of the first matching algorithm and the second matching algorithm as a primary algorithm, and wherein the primary algorithm may be set as one selected from at least one of: an algorithm having a higher priority of the first matching algorithm and the second matching algorithm, an algorithm included in a template DB including more templates of the first template DB and the second template DB, or an algorithm having a higher matching success rate of the first matching algorithm and the second matching algorithm.

According to various embodiments of the disclosure, a method for performing biometric authentication by an electronic device may comprise performing (810) biometric authentication using a first matching algorithm and a first template DB, installing (805) a second matching algorithm and a second template DB and setting the second template DB to an inactive state, determining (820) whether a predetermined template registration condition is met if biometric authentication using the first matching algorithm and the first template DB is successful (815), generating (825) a template including input biometric information of the successful biometric authentication and registering the template in the second template DB in the inactive state if the template registration condition is met, setting (835) the second template DB to an active state if the second template DB meets a predetermined template activation condition (830), and performing (840) the biometric authentication using the second matching algorithm and the second template DB in the active state.

According to an embodiment, the template registered in the second template DB may be generated using the second matching algorithm based on the input biometric information of the successful biometric authentication.

According to an embodiment, the template registration condition may include a condition where a matching similarity of the biometric authentication successful using the first matching algorithm and the first template DB is larger than a first threshold.

According to an embodiment, the template registration condition may include a condition where a maximum similarity between the generated template and templates included in the second template DB is larger than a second threshold, and an average similarity between the generated template and the templates included in the second template DB is larger than a third threshold.

According to an embodiment, the template registration condition may include a condition where a sample quality of biometric samples included in the input biometric information meets a predetermined sample quality condition.

According to an embodiment, the template activation condition may include a condition where a number of templates included in the second template DB is larger than a first threshold.

According to an embodiment, the template activation condition may include a condition where a template diversity value between the templates included in the second template DB is larger than a second threshold.

According to an embodiment, if the second template DB is set to the active state, the first matching algorithm and the first template DB may be replaced with the second matching algorithm and the second template DB.

According to an embodiment, before the second matching algorithm and the second template DB are installed, the first matching algorithm and the first template DB, together with a third matching algorithm and a third template DB, may be used to perform the biometric authentication using multi-matching authentication. If the second template DB is set to the active state, the second matching algorithm and the second template DB may replace the third matching algorithm and the third template DB and be used.

According to an embodiment, the method may further comprise, if the third matching algorithm and the third template DB are replaced with the second matching algorithm and the second template DB, performing an operation of setting one of the first matching algorithm and the second matching algorithm as a primary algorithm. The primary algorithm may be set as an algorithm having a higher priority of the first matching algorithm and the second matching algorithm, an algorithm included in a template DB including more templates of the first template DB and the second template DB, or an algorithm having a higher matching success rate of the first matching algorithm and the second matching algorithm.

Various embodiments of the disclosure may address incompatibility of templates that occurs upon changing/updating a matching algorithm in a biometric authentication system and resultant user inconvenience, such as abnormal operation of biometric authentication and biometric re-registration. Through various embodiments of the disclosure, the user may continuously use the enhanced biometric authentication system without a separate operation, such as biometric re-registration. According to various embodiments of the disclosure, it is possible to develop more effective algorithms and enhance recognition accuracy by removing limitations on updating the matching algorithm while allowing for easier maintenance of the biometric authentication system.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., via wire), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

There may be provided a storage medium storing instructions configured to, when executed by at least one processor, enable the at least one processor to perform at least one operation that may include performing biometric authentication using a first matching algorithm and a first template DB, installing a second matching algorithm and a second template DB and setting the second template DB to an inactive state, determining whether a predetermined template registration condition is met if biometric authentication using the first matching algorithm and the first template DB is successful, generating a template including input biometric information of the successful biometric authentication and register the template in the second template DB in the inactive state if the template registration condition is met, setting the second template DB to an active state if the second template DB meets a predetermined template activation condition, and performing the biometric authentication using the second matching algorithm and the second template DB in the active state.

The embodiments disclosed herein are provided merely for better understanding of the present invention, and the present invention should not be limited thereto or thereby. It should be appreciated by one of ordinary skill in the art that various changes in form or detail may be made to the embodiments without departing from the scope of the present disclosure defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
a biometric sensor;
a memory storing at least one template database (DB) including templates representing biometric features; and
at least one processor operatively connected with the biometric sensor and the memory, wherein the at least one processor is configured to:
perform biometric authentication using a first matching algorithm and a first template DB, the first template DB being among the at least one template DB;
install a second matching algorithm and a second template DB, the second template DB being among the at least one template DB;
set the second template DB to an inactive state;
determine whether a predetermined template registration condition is met based on identifying the biometric authentication using the first matching algorithm and the first template DB is successful;
in response to a determination that the template registration condition is met, generate a template including input biometric information of the successful biometric authentication and register the template in the second template DB in the inactive state;
in response to identifying the second template DB meets a predetermined template activation condition, set the second template DB to an active state; and
perform biometric authentication using the second matching algorithm and the second template DB in the active state.

2. The electronic device of claim 1, wherein the template registered in the second template DB is generated, based on the input biometric information of the successful biometric authentication, using the second matching algorithm.

3. The electronic device of claim 1, wherein the template registration condition includes a condition where a matching similarity of the successful biometric authentication using the first matching algorithm and the first template DB is larger than a first threshold.

4. The electronic device of claim 3, wherein the template registration condition includes at least one of:
a condition where a maximum similarity between the generated template and templates included in the second template DB is larger than a second threshold, and
an average similarity between the generated template and the templates included in the second template DB is larger than a third threshold, and
a condition where a sample quality of biometric samples included in the input biometric information meets a predetermined sample quality condition.

5. The electronic device of claim 1, wherein the template activation condition includes at least one of:
a condition where a number of templates included in the second template DB is larger than a first threshold; and
a condition where a template diversity value between the templates included in the second template DB is larger than a second threshold.

6. The electronic device of claim 1, wherein the at least one processor is configured to, when the second template DB is set to the active state:
replace the first matching algorithm and the first template DB with the second matching algorithm and the second template DB, respectively; and
perform the biometric authentication using the second matching algorithm and the second template DB.

7. The electronic device of claim 1, wherein the at least one processor is configured to:
before the second matching algorithm and the second template DB are installed, perform biometric authentication using multi-matching authentication that uses a third matching algorithm and a third template DB, together with the first matching algorithm and the first template DB; and
when the second template DB is set to the active state:
replace the third matching algorithm and the third template DB with the second matching algorithm and the second template DB, respectively; and
perform the biometric authentication using the multi-matching authentication.

8. The electronic device of claim 7, wherein the at least one processor is configured to, when the third matching algorithm and the third template DB are replaced with the second matching algorithm and the second template DB, perform an operation of setting one of the first matching algorithm and the second matching algorithm as a primary algorithm, and
wherein the primary algorithm is set as one selected from at least one of:
an algorithm having a higher priority of the first matching algorithm and the second matching algorithm,
an algorithm included in a template DB including more templates of the first template DB and the second template DB, or
an algorithm having a higher matching success rate of the first matching algorithm and the second matching algorithm.

9. A method for performing biometric authentication by an electronic device, the method comprising:
performing biometric authentication using a first matching algorithm and a first template DB;
installing a second matching algorithm and a second template DB;
setting the second template DB to an inactive state;
determining whether a predetermined template registration condition is met based on identifying the biometric authentication using the first matching algorithm and the first template DB is successful;
in response to a determination that the template registration condition is met, generating a template including input biometric information of the successful biometric authentication and registering the template in the second template DB in the inactive state;

in response to identifying the second template DB meets a predetermined template activation condition, setting the second template DB to an active state; and performing biometric authentication using the second matching algorithm and the second template DB in the active state.

10. The method of claim 9, wherein the template registered in the second template DB is generated, based on the input biometric information of the successful biometric authentication, using the second matching algorithm.

11. The method of claim 9, wherein the template registration condition includes at least one of:
- a condition where a matching similarity of the biometric authentication successful using the first matching algorithm and the first template DB is larger than a first threshold;
- a condition where a maximum similarity between the generated template and templates included in the second template DB is larger than a second threshold, and an average similarity between the generated template and the templates included in the second template DB is larger than a third threshold; and
- a condition where a sample quality of biometric samples included in the input biometric information meets a predetermined sample quality condition.

12. The method of claim 9, wherein the template activation condition includes at least one of:
- a condition where a number of templates included in the second template DB is larger than a first threshold; and
- a condition where a template diversity value between the templates included in the second template DB is larger than a second threshold.

13. The method of claim 9, further comprising when the second template DB is set to the active state, replacing the first matching algorithm and the first template DB with the second matching algorithm and the second template DB, respectively.

14. The method of claim 9, further comprising:
- before the second matching algorithm and the second template DB are installed, performing biometric authentication using multi-matching authentication that uses the first matching algorithm and the first template DB, together with a third matching algorithm and a third template DB; and
- when the second template DB is set to the active state, performing biometric authentication using the multi-matching authentication in which the second matching algorithm and the second template DB replace the third matching algorithm and the third template DB, respectively.

15. The method of claim 14, further comprising:
- when the third matching algorithm and the third template DB are replaced with the second matching algorithm and the second template DB, performing an operation of setting one of the first matching algorithm and the second matching algorithm as a primary algorithm,
- wherein the primary algorithm is set as one selected from at least one of:
- an algorithm having a higher priority of the first matching algorithm and the second matching algorithm,
- an algorithm included in a template DB including more templates of the first template DB and the second template DB, or
- an algorithm having a higher matching success rate of the first matching algorithm and the second matching algorithm.

* * * * *